(12) United States Patent
Ackerman et al.

(10) Patent No.: US 11,565,844 B2
(45) Date of Patent: Jan. 31, 2023

(54) METHODS AND APPARATUS TO FACILITATE PLASTIC FILM PROCESSING

(71) Applicant: S. C. JOHNSON & SON, INC., Racine, WI (US)

(72) Inventors: Bryan L. Ackerman, Freeland, MI (US); Daniel P. Zimmerman, Midland, MI (US)

(73) Assignee: S.C. JOHNSON & SON, INC., Racine, WI (US)

( * ) Notice: Subject to any disclaimer, the term of this patent is extended or adjusted under 35 U.S.C. 154(b) by 635 days.

(21) Appl. No.: 16/230,551

(22) Filed: Dec. 21, 2018

(65) Prior Publication Data

US 2020/0198825 A1 Jun. 25, 2020

(51) Int. Cl.
| | |
|---|---|
| *B65B 61/10* | (2006.01) |
| *B65B 57/02* | (2006.01) |
| *B65B 51/30* | (2006.01) |
| *B29C 65/22* | (2006.01) |
| *B29C 65/00* | (2006.01) |
| *B29L 31/00* | (2006.01) |
| *B65B 9/04* | (2006.01) |

(52) U.S. Cl.
CPC ............ *B65B 61/10* (2013.01); *B29C 65/222* (2013.01); *B29C 66/43121* (2013.01); *B29C 66/73921* (2013.01); *B29C 66/8161* (2013.01); *B29C 66/849* (2013.01); *B65B 51/30* (2013.01); *B65B 57/02* (2013.01); *B29L 2031/712* (2013.01); *B65B 2009/047* (2013.01)

(58) Field of Classification Search
CPC ......... B65B 51/10; B65B 51/30; B65B 57/02; B65B 2009/047; B29C 66/43121; B29C 65/222; B29C 66/73921; B29C 66/849; B29L 2031/712
See application file for complete search history.

(56) References Cited

U.S. PATENT DOCUMENTS

| | | | | |
|---|---|---|---|---|
| 3,574,039 A | * | 4/1971 | Fehr | ........................ B65B 61/10 |
| | | | | 156/515 |
| 3,940,305 A | | 2/1976 | Stenberg | |

(Continued)

FOREIGN PATENT DOCUMENTS

| | | |
|---|---|---|
| CN | 103523486 A | 1/2014 |
| DE | 102007021967 A1 | 11/2008 |

(Continued)

OTHER PUBLICATIONS

International Search Report and Written Opinion issued in corresponding International Application No. PCT/US2019/033947, dated Nov. 4, 2019, 18 pages.

(Continued)

*Primary Examiner* — Robert F Long
*Assistant Examiner* — Xavier A Madison
(74) *Attorney, Agent, or Firm* — Quarles & Brady LLP

(57) ABSTRACT

A system includes a film processing module, a processor, and memory. The processor and memory are in communication with the film processing module. The processor is configured to dynamically coordinate movement of the film processing module relative to a moving web of film and to perform a function on the web of film with the film processing module.

24 Claims, 13 Drawing Sheets

(56) References Cited

U.S. PATENT DOCUMENTS

| | | | |
|---|---|---|---|
| 4,176,000 A * | 11/1979 | Achelpohl | B29C 66/4312 |
| | | | 156/510 |
| 4,430,069 A | 2/1984 | Carlisle | |
| 4,449,962 A | 5/1984 | Copia | |
| 4,452,113 A * | 6/1984 | Pearl | B26D 7/018 |
| | | | 83/152 |
| 4,464,219 A | 8/1984 | Colombo et al. | |
| 4,761,197 A * | 8/1988 | Christine | B29C 65/18 |
| | | | 156/290 |
| 4,825,625 A | 5/1989 | Hufford | |
| 4,853,602 A | 8/1989 | Hommes et al. | |
| 5,072,493 A | 12/1991 | Hommes et al. | |
| 5,094,657 A * | 3/1992 | Dworak | B29C 65/7457 |
| | | | 493/208 |
| 5,109,653 A * | 5/1992 | Kubis | B29C 65/3644 |
| | | | 53/510 |
| 5,131,213 A | 7/1992 | Shanklin et al. | |
| 5,445,053 A | 8/1995 | Kallner | |
| 5,662,575 A | 9/1997 | Saito et al. | |
| 5,690,600 A * | 11/1997 | Yang | B29C 66/133 |
| | | | 493/194 |
| 5,699,653 A * | 12/1997 | Hartman | B65H 45/221 |
| | | | 53/455 |
| 5,836,136 A * | 11/1998 | Highberger | B29C 65/743 |
| | | | 53/75 |
| 6,085,495 A | 7/2000 | Fontanazzi et al. | |
| 6,408,600 B1 * | 6/2002 | Nankervis | B29C 65/226 |
| | | | 53/477 |
| 6,625,517 B1 * | 9/2003 | Bogdanov | B29C 66/872 |
| | | | 700/193 |
| 6,629,400 B1 * | 10/2003 | Offermann | B29C 66/9241 |
| | | | 53/374.6 |
| 6,656,100 B1 | 12/2003 | Tseng | |
| 6,862,867 B2 | 3/2005 | Cady et al. | |
| 6,876,107 B2 | 4/2005 | Jacobs | |
| 6,876,896 B1 * | 4/2005 | Ortiz | B29C 66/8351 |
| | | | 700/112 |
| 7,155,883 B2 | 1/2007 | Baldanza et al. | |
| 7,174,699 B1 | 2/2007 | Wyman et al. | |
| 7,229,512 B2 | 6/2007 | Streicher | |
| 7,325,374 B2 * | 2/2008 | Chrisman | B65B 9/02 |
| | | | 53/203 |
| 7,328,556 B2 | 2/2008 | Taylor, Sr. | |
| 7,866,886 B2 | 1/2011 | Kurosawa et al. | |
| 7,980,047 B1 | 7/2011 | Woody et al. | |
| 8,069,637 B2 | 12/2011 | Taylor, Sr. et al. | |
| 8,424,703 B2 | 4/2013 | Meulen | |
| 8,616,134 B2 | 12/2013 | King et al. | |
| 8,863,669 B2 | 10/2014 | Young et al. | |
| 9,096,013 B2 | 8/2015 | Kagawa et al. | |
| 9,481,128 B2 | 11/2016 | Hsu | |
| 9,505,504 B2 | 11/2016 | Murray et al. | |
| 9,637,262 B2 | 5/2017 | Pedretti et al. | |
| 9,802,507 B2 | 10/2017 | Clark et al. | |
| 9,944,037 B2 | 4/2018 | Murray et al. | |
| 10,843,414 B2 * | 11/2020 | Melandri | B29C 65/74 |
| 2003/0136086 A1 | 7/2003 | Kalany et al. | |
| 2004/0046081 A1 * | 3/2004 | Achelpohl | B65H 19/265 |
| | | | 242/527.1 |
| 2004/0256373 A1 * | 12/2004 | Irwin | B29C 66/81417 |
| | | | 219/243 |
| 2005/0126129 A1 | 6/2005 | Nesci | |
| 2011/0088351 A1 * | 4/2011 | Zeiler | B29C 65/305 |
| | | | 53/52 |
| 2012/0281934 A1 * | 11/2012 | Dytchkowskyj | B65D 33/2591 |
| | | | 383/64 |
| 2012/0289391 A1 | 11/2012 | Murray et al. | |
| 2013/0152516 A1 | 6/2013 | Sammons et al. | |
| 2014/0290866 A1 * | 10/2014 | Brufau Redondo | B29C 70/386 |
| | | | 156/535 |
| 2015/0175288 A1 | 6/2015 | Alquati | |
| 2016/0122059 A1 | 5/2016 | Zahn | |
| 2016/0207658 A1 | 7/2016 | Bellante | |
| 2016/0325490 A1 | 11/2016 | Safai et al. | |
| 2017/0174377 A1 | 6/2017 | Peebles | |
| 2018/0056572 A1 * | 3/2018 | Karr | B29C 51/24 |
| 2018/0127192 A1 * | 5/2018 | Cohen | G07F 11/1657 |
| 2019/0002136 A1 * | 1/2019 | Bomgaars | B65B 31/024 |
| 2019/0308375 A1 * | 10/2019 | Melandri | B29C 66/849 |

FOREIGN PATENT DOCUMENTS

| | | |
|---|---|---|
| EP | 0999137 A2 | 5/2000 |
| JP | 2016210183 A | 12/2016 |
| WO | 2009135144 A2 | 11/2009 |
| WO | 2018222565 A1 | 12/2018 |

OTHER PUBLICATIONS

Examination report No. 1 for standard patent application issued in corresponding Australian Application No. 2019284104, dated May 20, 2020, 9 pages.

First Office Action from corresponding Japanese Patent Application No. 2019-572419, dated Dec. 8, 2020 (6 pages).

Partial European Search Report from European Patent Application No. 21000186.3 dated Oct. 29, 2021 (12 pages).

Office Action from corresponding Japan patent application No. 2021-127620, dated Jul. 20, 2022 (6 pages).

Non-Final Office Action from corresponding U.S. Appl. No. 17/105,015, dated Sep. 30, 2022 (68 pages).

* cited by examiner

METHODS AND APPARATUS TO FACILITATE PLASTIC FILM PROCESSING

FIELD OF THE DISCLOSURE

This disclosure relates generally to film processing, and, more particularly, to methods and apparatuses for facilitating the processing of plastic film into finished plastic film products.

BACKGROUND

In recent years, products made from plastic film and machinery to continually produce those products have been developed. These plastic film products typically have sealed seams and zippers to form a reclosable pouch. In some instances, these plastic film products also have pre-printed images. Plastic film processing machinery typically includes tools to cut pouch components from a sheet or tube of plastic film, place zippers, and to weld the pouch components and zippers together.

Certain known film product manufacturing methods use multiple processing stations each equipped with different machinery and associated conveyors to move film products in various stages of completion between those stations. Thus, those known film product manufacturing methods have large footprints in a manufacturing facility to produce finished plastic film products. Further, with certain known film product manufacturing methods the entire film product manufacturing line may need to be stopped to perform maintenance on the multiple pieces of different machinery.

Additionally, while pre-printed film rolls are typically uniform within a single roll, there are often spatial differences between first and second pre-printed rolls even bearing the same images. In others words, the images on the second roll are out of phase (sometimes referred to as "creep") with respect to the first roll. Thus, if a pre-printed film roll is misaligned with respect to the film processing machinery, the pre-printed images will cyclically be cut through. Thus, certain known film product manufacturing methods contemplate stopping and realigning all of the film processing machinery in a film processing station whenever a new pre-printed web of film is introduced to the film processing station.

Therefore, a need exists to develop film product manufacturing methods and associated machinery that take up less space, compensate for differences between pre-printed film rolls, and may be more easily and quickly maintained, repaired, and aligned.

SUMMARY

In one aspect, a system is disclosed, which includes a film processing module, a processor, and memory. The processor and memory are in communication with the film processing module. The processor is configured to dynamically coordinate movement of the film processing module relative to a moving web of film and to perform a function on the web of film with the film processing module.

In another aspect, a film processing module is disclosed, which includes a carriage assembly, a linear actuator, and an upper multi-functional assembly. The carriage assembly is configured to move along a supporting rail. The linear actuator is engaged with the carriage assembly. The upper multi-functional assembly is engaged with the linear actuator to perform a function on a film adjacent to the supporting rail.

In yet another aspect, a method for producing film products is disclosed. The method utilizes a processor to perform the steps of dynamically coordinating movement of a film processing module relative to a moving web of film and instructing the film processing module to perform a function on the web of film.

In a further aspect, a film processing module is disclosed, which includes a carriage assembly, a linear actuator, a base, and an upper multi-functional assembly. The carriage assembly is configured to move along a supporting rail. The linear actuator is engaged with the carriage assembly. The base is engaged with the linear actuator. The upper multi-functional assembly is driveably engaged with the linear actuator to move relative to the base. The upper multi-functional assembly includes a clamping plate to selectively clamp a portion of a film against the base and a cutting mechanism to cut and seal the portion of the film.

In a different aspect, a method for producing sealed film products is disclosed. The method utilizes a processor to perform the steps of moving an upper multi-functional assembly of a film processing module to a ready position relative to a base of the film processing module, moving the film processing module to an aligned location on an oblong supporting rail such that a portion of a film running parallel to the oblong supporting rail is between the upper multi-functional assembly and the base, moving the upper multi-functional assembly toward the base to a clamping position to clamp the film, energizing a cutting mechanism of the upper multi-functional assembly to heat the cutting mechanism, moving the upper multi-functional assembly toward the base to a cutting position to cut the film, moving the upper multi-functional assembly away from the base to an open position, and moving the film processing module to a transfer location on the supporting rail such that a conveyor is between the upper multi-functional assembly and the base.

In yet another aspect, a system is disclosed that includes an oblong supporting rail, a power source and a controller in electrical communication with the supporting rail, and a film processing module moveably engaged with the supporting rail. The film processing module includes a base, an upper multi-functional assembly, and a linear actuator. The linear actuator is fixed to the base and driveably engaged to the upper multi-functional assembly to move the upper multi-functional assembly relative to the base. The upper multi-functional assembly includes a clamping plate and a cutting mechanism in electrical communication with the power source and the controller to cut and seal film.

DETAILED DESCRIPTION

Figure 1:
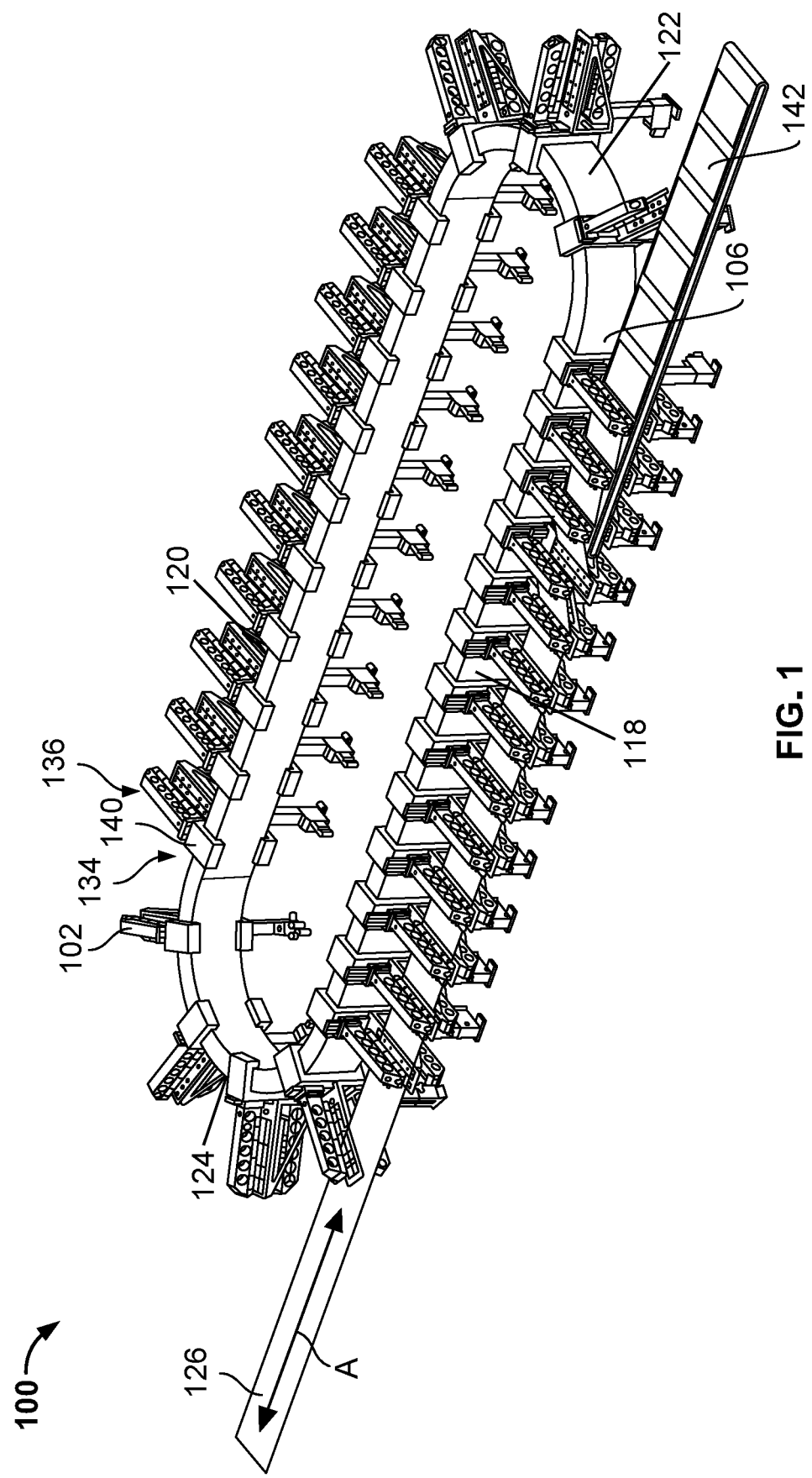
FIG. 1 is an isometric view of an example film processing station, according to one exemplary embodiment.

As explained herein, the present disclosure provides examples of a film processing station with multiple film processing modules that improve film cutting, shaping, and sealing, e.g., to produce plastic film pouches. The film processing station exhibits a comparatively small footprint to manufacture plastic film products. Additionally, the film processing modules each independently clamp, cut, and seal plastic film into finished products, and transfer the finished products to a waiting conveyor, e.g., for packaging.

As shown in FIGS. 1-10, a film processing station 100 includes one or more film processing modules 102, a conveyor 104, a supporting rail 106, a bus power source 108*a*, a rail power source 108*b*, a bus air source 108*c*, a main controller 110*a*, a rail controller 110*b*, a power and air bus 112, a first transceiver 114, a registration sensor 116*a*, and a plurality of rail sensors 116*b*. It should be understood that each film processing module 102 is substantially structurally identical to the other film processing modules 102. Thus, multiple film processing modules 102 can be used on the supporting rail 106 at a given time and the film processing modules 102 are interchangeable with one another, without requiring modification to the conveyor 104, the supporting rail 106, the bus power source 108*a*, the rail power source 108*b*, the bus air source 108*c*, the main controller 110*a*, the rail controller 110*b*, the power and air bus 112, the first transceiver 114, the registration sensor 116*a*, and/or the plurality of rail sensors 116*b*. It is also contemplated that alternative film processing modules structurally different from the illustrated film processing modules 102 may be used in conjunction with the supporting rail 106 and the film processing modules 102.

Figure 2:
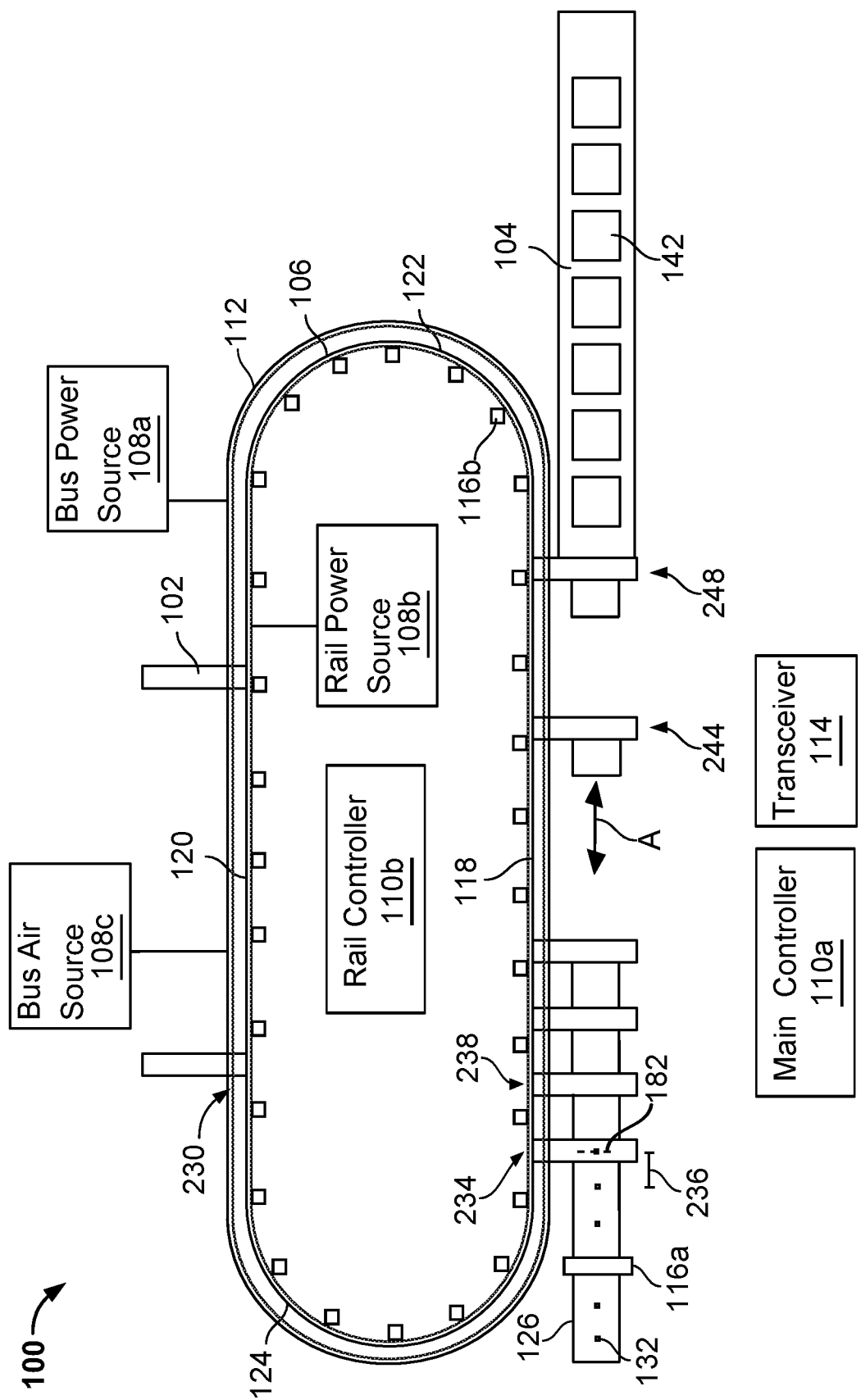
FIG. 2 is a schematic overhead view of the film processing station of FIG. 1.

Referring to FIG. 2, the main controller 110*a* is in communication with the rail controller 110*b*, the transceiver 114, the registration sensor 116*a*, and the rail sensors 116*b*. The main controller 110*a* controls the movements of the film processing modules 102 along the supporting rail 106 via the rail controller 110*b*. The main controller 110*a* controls the film processing functions of the film processing modules 102, e.g., cutting and sealing, etc., via the transceiver 114 and/or the bus 112. The bus 112 supplies electrical power and, in some embodiments, compressed air to the film processing modules 102 to perform their respective film processing functions. Interactions between the main controller 110*a*, the rail controller 110*b*, the transceiver 114, the registration sensor 116*a*, and the rail sensors 116*b*, will be explained in greater detail below in conjunction with FIGS. 11-13.

With particular reference again to FIG. 2, the supporting rail 106 forms an oblong circuit with opposing, generally straight, parallel first and second sides 118, 120 and opposing first and second rounded ends 122, 124. It is further contemplated that the oblong circuit may be characterized as substantially race-track shaped or may take some other form with both linear and curvilinear segments to form a track. The rail sensors 116*b* are regularly-spaced along the length of the supporting rail 106. It should be understood that the supporting rail 106 is formed of modular panels and thus may be any desired size. The supporting rail 106 is in electrical communication with and is powered by the rail power source 108*b*. The rail power source 108*b* is controlled by the rail controller 110*b*. Each of the film processing modules 102 is moveably engaged with the supporting rail 106.

It should be appreciated that each of the film processing modules 102 are independent of one another. The number of film processing modules 102 on the supporting rail 106 is based on the length and/or shape of the supporting rail 106. In operation, the rail controller 110*b* selectively operates all or a subset of the film processing modules 102. Further, in operation, main controller 110*a* via the rail controller 110*b* independently controls the movement of each of the film processing modules 102 around the supporting rail 106. Additionally, in operation, the controllers 110*a, b* may control the film processing modules 102 to move about the supporting rail 106 at varying travel speeds. Thus, the film processing modules 102 may approach or move away from one another as they move about the supporting rail 106. In other words, in operation, the controllers 110*a, b* dynamically coordinate the independent movements of the film processing modules 102 about the supporting rail 106. Additionally, where alternative film processing modules are used in conjunction with or in place of the illustrated film processing modules 102, the controllers 110*a, b* also dynamically coordinate the independent movements of these alternative film processing modules.

With reference again to FIG. 2, in the illustrated example, the bus 112 is disposed concentrically external to the supporting rail 106 to provide the film processing modules 102 with electrical power and/or compressed air. It should be appreciated that the bus 112 may be placed in any arrangement relative to the supporting rail 106 that provides electrical power and/or compressed air to the film processing modules 102 as the film processing modules 102 move about the supporting rail 106. For example, the film processing modules 102 may be arranged to receive electrical power and/or compressed air where the bus 112 is concentrically internal to, under, or above the supporting rail 106.

With reference to FIG. 1, a web of a film 126 is depicted adjacent or otherwise alongside the first side 118. When the film 126 is presented to the film processing station 100, the film 126 is in tube form or folded. Thus, the film 126 has a top layer 128 and a bottom layer 130 as shown in FIGS. 5, 6, and 8-10. In some embodiments, the film 126 is provided as a starting material to the film processing station 100 from an unwind machine. In other embodiments, the film 126 is extruded flat, printed on, folded, and then provided as a starting material to the film processing station 100. In yet other embodiments, zippers are positioned and attached to the film 126, the film 126 is folded, and the zippers are closed before the film 126 is provided as a starting material to the film processing station 100.

Figure 3:
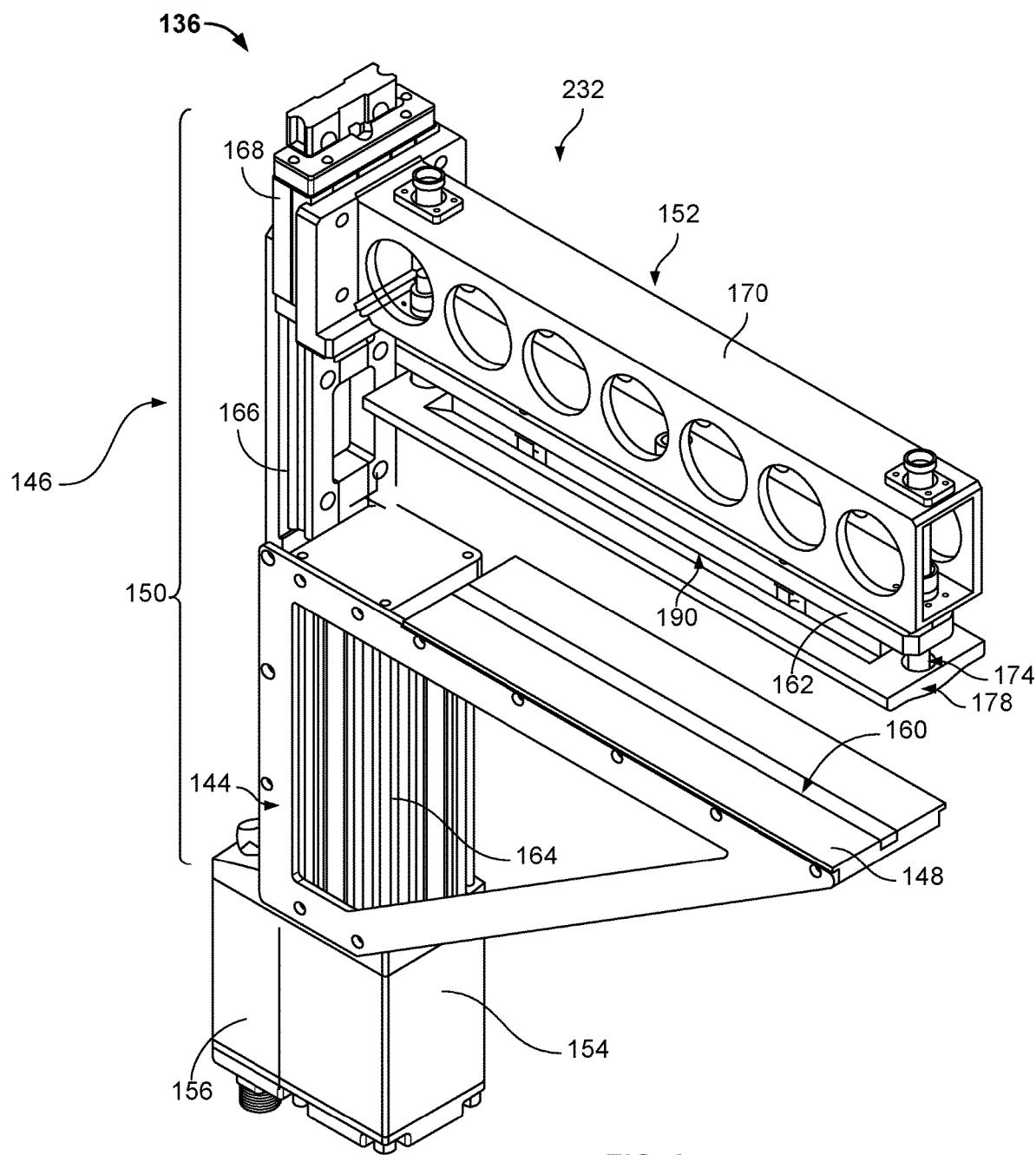
FIG. 3 is an isometric view of a film processing module of the film processing station of FIG. 1 in an open position.

With reference to the embodiment illustrated in FIGS. 1-3, the film processing modules 102 are adapted to clamp, cut, and seal the film 126. It should be understood and appreciated that alternative film processing modules mounted on the supporting rail 106 and used in conjunction with or in place of the film processing modules 102 may perform other functions on the film 126. For example, the alternative film processing modules may emboss decorative patterns and/or production information into the film 126, print decorative patterns and/or production information onto the film 126, perforate the film 126, place closure zippers on the film 126, ultrasonically form the film 126, abrade the film 126 with sand and/or water jets, melt patterns into the film 126, laser ablate the film 126, remove lip portions of the film 126, add discrete parts to the film 126, cut shapes into the film 126, score the film 126, hot bar seal the film 126, etc. Thus, multiple types of film processing modules may be used together to perform successive in-line functions on the film 126. For example, the film 126 may have an image printed on it by a printer film processing module, then be embossed by an embosser film processing module, and then cut into pouches by the illustrated cutting film processing module 102. Alternatively, it is contemplated that multiple types of film processing modules may be used in other manners, e.g., certain modules may remain idle during a first phase of a process and may be active alone or in combination with other modules in a second phase of a process. In fact, it is contemplated that any combination or arrangement of similar or different film processing modules may be used.

With particular reference to FIG. 2, the film 126 has a plurality of demarcations 132. In some embodiments, the demarcations 132 are printed on the film 126. In some embodiments, the demarcations 132 are embossed into the film 126. In some embodiments, the demarcations 132 are raised features of the film 126. It is contemplated that the demarcations 132 may take any form to provide location reference points on the otherwise generally uniform film 126. The registration sensor 116*a* is disposed adjacent to the film 126 to detect the demarcations 132. In the illustrated example, the registration sensor 116*a* is transverse to the film 126.

Looking again at FIG. 1, more specifically, each of the film processing modules 102 includes a carriage assembly 134 and a forming assembly 136. The carriage assemblies 134 are in communication with the supporting rail 106. The carriage assemblies 134 each include a supporting bracket 140. The supporting bracket 140 is moveably engaged with the supporting rail 106. The carriage assemblies 134 each further include position magnets engaged to the supporting bracket 140 (not shown). The position magnets actuate the rail sensors 116*b* in the supporting rail 106. The forming assembly 136 is engaged with the supporting bracket 140. It should be understood that the supporting rail 106, the rail power source 108*b*, the rail sensors 116*b*, and the carriage assemblies 134 may be provided as a complete motion control kit, e.g., an iTrak® system available through Rockwell Automation.

Referring to FIGS. 1 and 2, in addition to the film processing modules 102 being selectively operated by the controllers 110*a, b*, it is contemplated that, in some embodiments, the forming assembly 136 is selectively not attached to the carriage assembly 134. Thus, selective ones of the film processing modules 102 are reduced to the base carriage assemblies 134 and perform no film processing functions. In other words, depending on the film process to be accomplished, the film processing station 100 may be outfitted to have "blank" film processing modules 102.

In one embodiment, the carriage assemblies 134 each further include one or more rollers, and a motor. The rollers and the motor are engaged to the supporting bracket 140. The rollers are in rolling contact with the supporting rail 106. Thus, the supporting bracket 140 is supported by and moveably engaged with the supporting rail 106. Additionally, one or more of the rollers is driven by the motor. Thus, the motors of the carriage assemblies 134 are powered by the rail power source 108*b* and controlled by the main controller 110*a* via the rail controller 110*b* and the supporting rail 106. In other words, the motor drives one or more of the rollers to translate the film processing module 102 along the supporting rail 106. Movement of the film processing modules 102 along the supporting rail 106 is controlled via the controllers 110*a, b* based on signals from the rail sensors 116*b* in the supporting rail 106.

Alternatively, or in combination with the prior disclosure, the processing modules 102 are moved electromagnetically via magnets disposed about the supporting rail 106. Each carriage assembly 134 includes a magnetic drive mechanism for movement around the supporting rail 106. Similar to the discussion above, the movement of the film processing modules 102 along the supporting rail 106 is controlled via the controllers 110*a, b* based on signals from the rail sensors 116*b* in the supporting rail 106.

As shown in FIGS. 1 and 2, because the supporting rail 106 is a closed circuit, the film processing modules 102 travel around the supporting rail 106. As the film processing modules 102 travel along the first side 118, the film processing modules 102 perform functions on the film 126 and deposit cut and sealed film products 142 onto the conveyor 104. Further, the film processing modules 102 travel along the first rounded end 122, the second side 120, and the second rounded end 124 to return to the film 126.

Turning to FIG. 3, the forming assembly 136 of each of the film processing modules 102 includes a frame 144, a base 148, a linear actuator 150, and an upper multi-functional assembly 152. In some embodiments, the forming assembly 136 further includes a second transceiver 154 and a battery 156. In some embodiments, the forming assembly 136 further includes an air controller 158 (see FIGS. 7-10).

More specifically, and with reference again to FIG. 3, the linear actuator 150 supports the frame 144. The frame 144 supports the base 148. Thus, the base 148 is cantilevered relative to the linear actuator 150. In the illustrated example, the frame 144 is a triangular brace. The upper multi-functional assembly 152 moves toward and away from the base 148 via the linear actuator 150. The frame 144, the base 148, and the upper multi-functional assembly 152 extend generally perpendicularly outwardly from the linear actuator 150 relative to the supporting rail 106. Thus, the base 148 and the upper multi-functional assembly 152 are generally parallel to one another. Additionally, the base 148 defines an outwardly extending inlay 160. In some examples, the inlay 160 is lined with an elastomer 162.

More specifically, the linear actuator 150 includes a motor (not shown) in a motor housing 164, a guide rail 166, and a sled 168. The second transceiver 154 and the battery 156 are supported by the motor housing 164. The guide rail 166 is engaged to the motor housing 164 and to the supporting bracket 140, as shown in FIGS. 1 and 3. The guide rail 166 extends upwardly relative to the motor housing 164. The sled 168 is moveably engaged with the guide rail 166, e.g., slidably, via bearings, etc. The frame 144 is engaged with the motor housing 164 and the guide rail 166. The upper multi-functional assembly 152 is engaged with the sled 168.

In some embodiments, the linear actuator 150 is in electrical communication with the bus 112, e.g., via electrical brushes. In some embodiments, the linear actuator 150 is in electrical communication with the battery 156. Thus, the motor of the linear actuator 150 is powered by the bus power source 108*a* and/or the battery 156. In some embodiments, the linear actuator 150 is controlled by the main controller 110*a* via the bus 112. In different embodiments, the linear actuator 150 is in electrical communication with the second transceiver 154 and is controlled by the main controller 110a via the first and second transceivers 114, 154. In other words, the motor receives instructions from the main controller 110a and drives the sled 168 to translate the upper multi-functional assembly 152 along the guide rail 166. Thus, movement of the upper multi-functional assembly 152 along the guide rail 166 is controlled via the main controller 110a.

Figure 4:
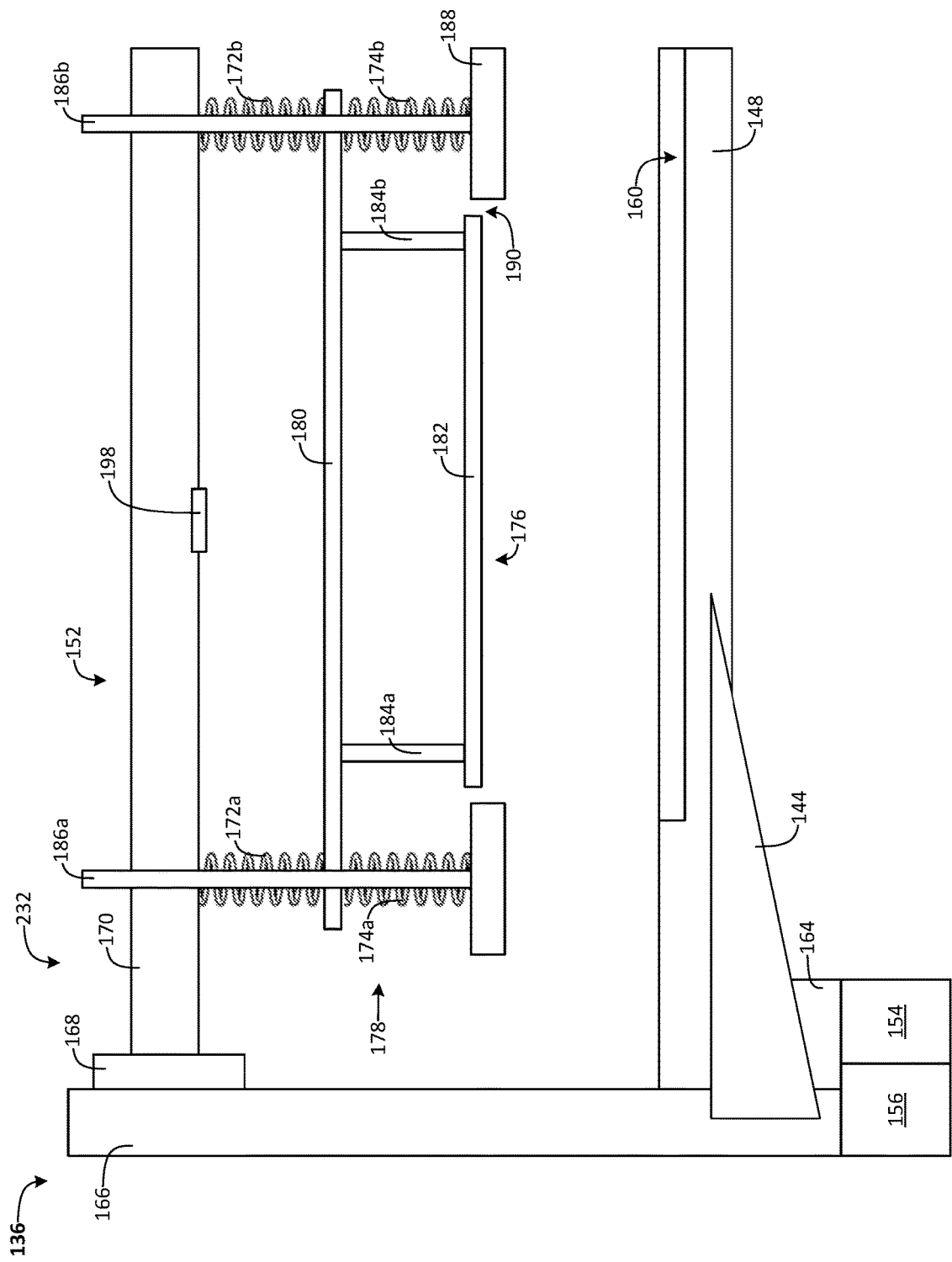
FIG. 4 is a schematic cross-sectional side view of the film processing module of FIGS. 1-3 in a ready position.

With reference now to FIG. 4, the upper multi-functional assembly 152 includes a support arm 170, a first upper biasing member 172a, a second upper biasing member 172b, a first lower biasing member 174a, a second lower biasing member 174b, a hot wire assembly 176, and a clamping assembly 178.

The hot wire assembly 176 includes a carrier plate 180, a cutting mechanism 182, a first support wire 184a, and a second support wire 184b. The first support wire 184a and the second support wire 184b are engaged with opposing ends of the cutting mechanism 182. Alternatively, the first and second support wires 184a, b may constitute other connector structures and may be positioned elsewhere along the length of the cutting mechanism 182. Turning again to the present embodiment, the first support wire 184a and the second support wire 184b are engaged with the carrier plate 180. Thus, the cutting mechanism 182 is suspended from the carrier plate 180.

The cutting mechanism 182 is depicted as generally straight to make straight cuts and seals through the film 126. It is additionally contemplated that the cutting mechanism 182 may have a curvilinear form. Thus, the cutting mechanism 182 may make corresponding curvilinear decorative and/or functional cuts and seals through the film 126, e.g., scalloped, interlocking, zigzagged, meandering, wave scrolled, undulating, etc. Further, while the cutting mechanism 182 is depicted as a wire, it is contemplated that the cutting mechanism 182 may be any type of cutting mechanism such as, for example, a knife, a blade, a punch, a saw, etc.

In some embodiments, the hot wire assembly 176 is in electrical communication with the bus 112. In other embodiments, the hot wire assembly 176 is in electrical communication with the battery 156. Thus, the hot wire assembly 176 is powered by the bus power source 108a and/or the battery 156. In some embodiments, the hot wire assembly 176 is controlled by the main controller 110a via the bus 112. In different embodiments, the hot wire assembly 176 is in electrical communication with the second transceiver 154 and is controlled by the main controller 110a via the first and second transceivers 114, 154. In other words, the hot wire assembly 176 receives instructions from the main controller 110a to energize and de-energize.

In some embodiments, the hot wire assembly 176 is continuously energized by the main controller 110a. When the hot wire assembly 176 is energized, the cutting mechanism 182 becomes hot to cut and seal the film 126, as will be explained in greater detail below. In other words, when an electric current is applied to the cutting mechanism 182, the cutting mechanism 182 heats to a temperature greater than or equal to the melting temperature of the film 126. Additionally, in some embodiments, the cutting mechanism 182 is arranged to be compatible with commercially available heaters that are controlled with controllers mounted on the forming assembly 136 (not shown).

It is contemplated that the film 126 may comprise any number of materials, including, for example, a thermoplastic material, metallic foil, layered composites, fabric, paper, etc. Illustrative thermoplastic materials that could be used include, for example, polypropylene (PP), polyethylene (PE), metallocene-polyethylene (mPE), low density polyethylene (LDPE), linear low density polyethylene (LLDPE), ultra-low density polyethylene (ULDPE), biaxially-oriented polyethylene terephthalate (BPET), high density polyethylene (HDPE), and polyethylene terephthalate (PET), among other polyolefin plastomers and combinations and blends thereof. Still other materials that may be used include styrenic block copolymers, polyolefin blends, elastomeric alloys, thermoplastic polyurethanes, thermoplastic copolyesters, thermoplastic polyamides, polymers and copolymers of polyvinyl chloride (PVC), polyvinylidene chloride (PVDC), saran polymers, ethylene/vinyl acetate copolymers, cellulose acetates, polyethylene terephthalate (PET), ionomer, polystyrene, polycarbonates, styrene acryloacrylonitrile, aromatic polyesters, linear polyesters, non-woven materials such as Tyvek®, and thermoplastic polyvinyl alcohols. Those skilled in the art will recognize that a wide variety of other materials may also be used to form the film 126. Illustrative sustainable films materials that could be used include, for example, bio-based polyethylenes such as LDPE, LLPDE, etc., renewable resins and/or bio-based feedstocks, post-consumer recycled plastics, compostable resins such as PHA, PBAT, PCL, PLA, etc.

With reference to FIGS. 3 and 4, the clamping assembly 178 includes a first post 186a, a second post 186b, and a clamping plate 188, which defines a cutting opening 190. The cutting opening 190 is sized to allow the cutting mechanism 182 to pass through the cutting opening 190. The first and second posts 186a, b are slidably engaged with the support arm 170. The clamping plate 188 is engaged with the first and second posts 186a, b. The first upper biasing member 172a and the first lower biasing member 174a are disposed about the first post 186a between the clamping plate 188 and the support arm 170. The second upper biasing member 172b and the second lower biasing member 174b are disposed about the second post 186b between the clamping plate 188 and the support arm 170. Thus, the clamping plate 188 is suspended from and moveable relative to the support arm 170. The first and second upper biasing members 172a, b and the first and second lower biasing members 174a, b bias the clamping plate 188 away from the support arm 170.

Referring still to FIGS. 3 and 4, the carrier plate 180 is slidably engaged with the first and second posts 186a, b. The carrier plate 180 is disposed between the first upper biasing member 172a and the first lower biasing member 174a. The carrier plate is disposed between the second upper biasing member 172b and the second lower biasing member 174b. Thus, the carrier plate 180 is sandwiched between the first and second upper biasing members 172a, b and the first and second lower biasing members 174a, b. In other words, the carrier plate 180 is slidably captured on the first and second posts 186a, b. The first and second upper biasing members 172a, b bias the carrier plate 180 away from the support arm 170. The first and second lower biasing members 174a, b bias the carrier plate 180 away from the clamping plate 188. Thus, the hot wire assembly 176 is suspended from and moveable relative to the support arm 170 and the clamping assembly 178.

In the illustrated example of FIGS. 3 and 4, the first and second upper biasing members 172a, b and the first and second lower biasing members 174a, b are coil springs. In some embodiments, the first and second first and second upper biasing members 172a, b have a greater spring force constant than the first and second lower biasing members 174a, b. In a preferred embodiment, the first and second lower biasing members 174*a, b* provide between approximately 50 and 60 pounds (222.4 and 266.9 Newtons) of clamping force. Thus, the first and second upper biasing members 172*a, b* push the first and second lower biasing members 174*a, b* during a cut cycle, as will be explained in greater detail below.

Figure 7:
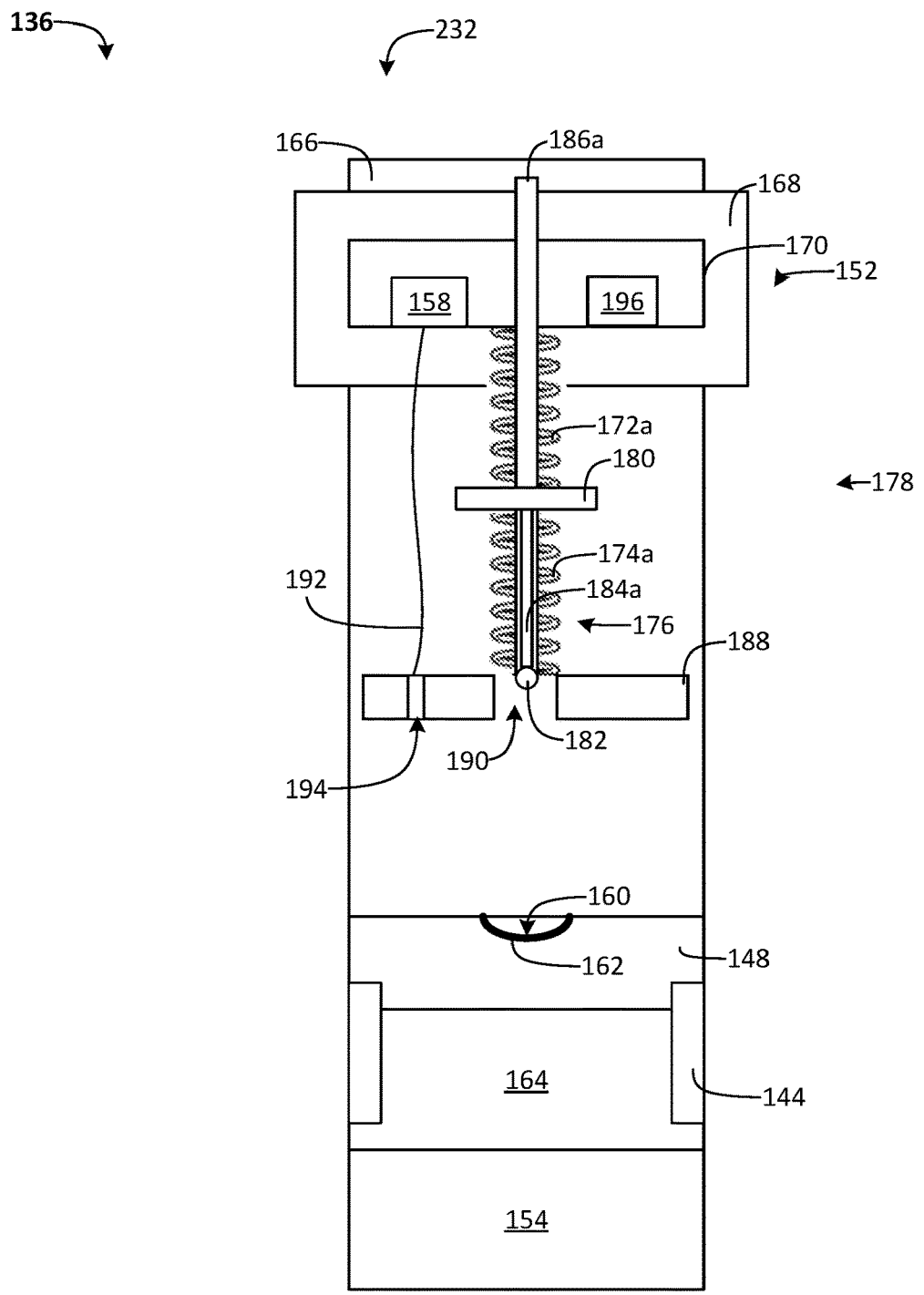
FIG. 7 is a schematic cross-sectional end view of the film processing module of FIG. 4 in the ready position.

In embodiments including the air controller 158, the clamping assembly 178 further includes one or more airflow lines 192 (see, for example, FIG. 7). In such embodiments, the clamping plate 188 further defines one or more airflow openings 194. The airflow openings 194 are defined in a trailing portion of the clamping plate 188 relative to the travel direction of the film processing modules 102 along the supporting rail 106. The airflow lines 192 attach to the clamping plate 188 at the airflow openings 194. In other words, the airflow lines 176 correspond to and are in fluid communication with the airflow openings 194. The airflow lines 192 are also in fluid communication with the air controller 158. The airflow lines 192 are flexible to accommodate movement of the clamping plate 188 relative to the support arm 170. In the present embodiment, it is contemplated that plant air is used in combination with a Venturi device to create a vacuum source.

The air controller 158 is an airflow directing device. In some embodiments, the air controller 158 is an electrically-driven air pump. In other embodiments, the air controller 158 is a pneumatically-driven Venturi device associated with an electrically or mechanically-driven valve. In such embodiments, the air controller 158 is in fluid communication with the bus 112 and the air controller 158 is pneumatically powered by the bus air source 108*c*. In some embodiments, the air controller 158 is in electrical communication with the bus 112. In other embodiments, the air controller 158 is in electrical communication with the battery 156. Thus, the air controller 158 is electrically powered by the bus power source 108*a* and/or the battery 156. In some embodiments, the air controller 158 is controlled by the main controller 110*a* via the bus 112. In different embodiments, the air controller 158 is in electrical communication with the second transceiver 154 and is controlled by the main controller 110*a* via the first and second transceivers 114, 154. In other words, the air controller 158 receives instructions from the main controller 110*a* to draw air through the airflow openings 194 and the airflow lines 192 to produce a vacuum between the film 126 and the clamping plate 188, as will be explained in greater detail below.

With reference to FIGS. 7-10, in some embodiments, the hot wire assembly 176 further includes an on-board heater controller 196. The heater controller 196 is in electrical communication with the cutting mechanism 182. In such embodiments, the cutting mechanism 182 includes one or more cartridge heaters.

The support arm 170 is engaged with the sled 168 to extend outwardly from the guide rail 166. The support arm 170 is hollow to reduce weight and to act as a housing for the air controller 158, the airflow lines 192, the heater controller 196, and/or wiring to power the hot wire assembly 176.

With particular reference to FIG. 4, in some embodiments, the forming assembly 136 further includes one or more module sensors 198. Operation of the module sensor 198 will be described in greater detail below.

Figure 11:
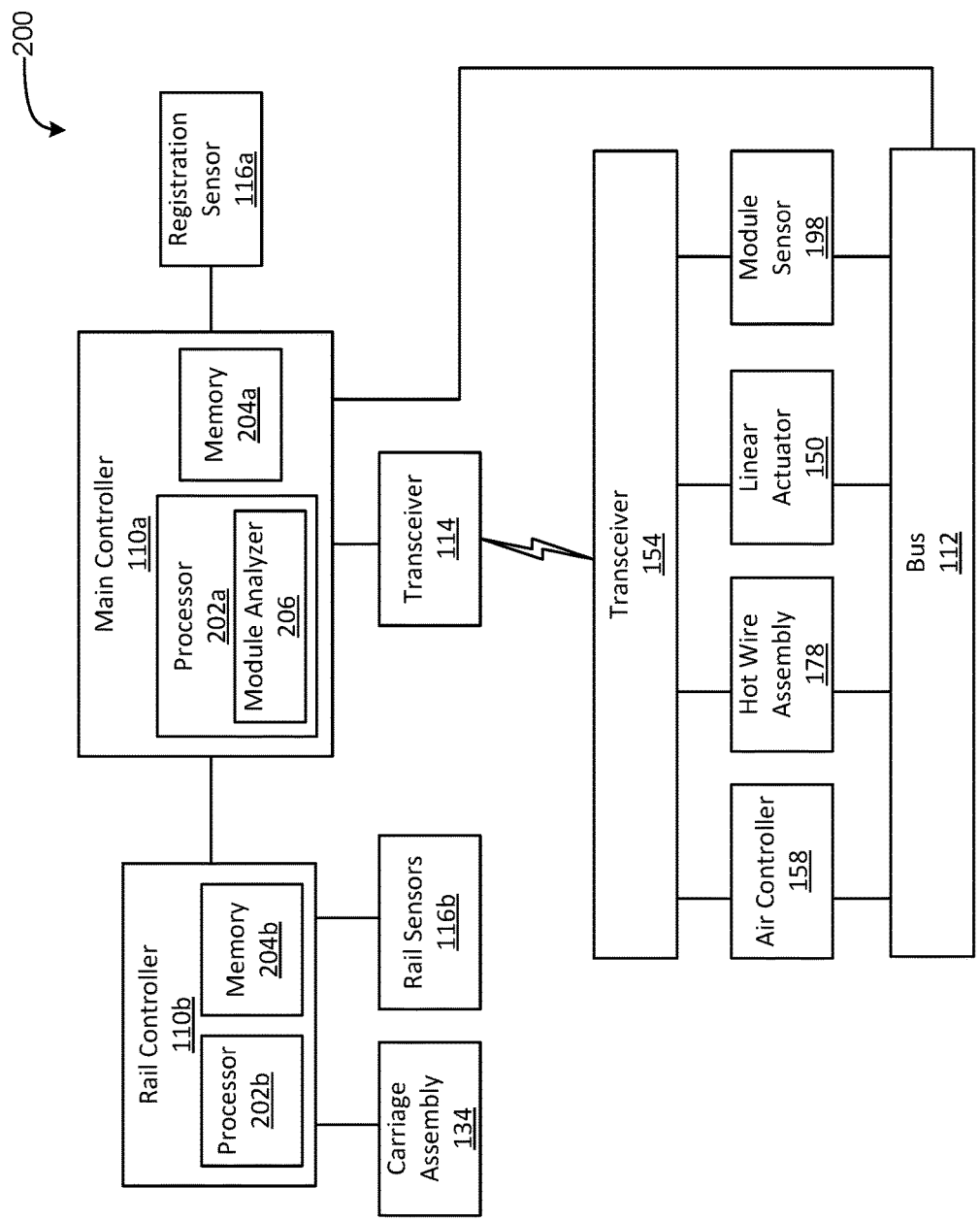
FIG. 11 is a block diagram of the electronic components of the film processing station of FIGS. 1 and 2.

With reference now to FIG. 11, the main controller 110*a*, the rail controller 110*b*, the bus 112, the first transceiver 114, the registration sensor 116*a*, the rail sensors 116*b*, the carriage assembly 134, the linear actuator 150, the second transceiver 154, the air controller 158, the hot wire assembly 178, and the module sensors 198 are collectively referred to as the electronic components 200 of the film processing station 100.

In some embodiments, the bus 112 communicatively couples the main controller 110*a*, the linear actuator 150, the air controller 158, the hot wire assembly 176, and the module sensors 198. In some embodiments, the linear actuator 150, the air controller 158, the hot wire assembly 176, and the module sensors 198 are communicatively coupled to the second transceiver 154, which is in wireless communication with the first transceiver 114. The bus 112 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7), a K-line bus protocol (ISO 9141 and ISO 14230-1), and/or an Ethernet bus protocol IEEE 802.3 (2002 onwards), etc.

The first and second transceivers 114, 154 include wired or wireless network interfaces to enable communication with external networks and with one another. The first and second transceivers 114, 154 also include hardware, e.g., processors, memory, storage, antennae, etc., and software to control the wired or wireless network interfaces. In some embodiments, the first and second transceivers 114, 154 includes a wired or wireless interface, e.g., an auxiliary port, a Universal Serial Bus (USB) port, a Bluetooth® wireless node, etc., to communicatively couple with a mobile device, e.g., a smartphone, a smart watch, etc. In such embodiments, the film processing station 100 may communicate with the external network via the mobile device. The external network may be a public network, such as the Internet; a private network, such as an intranet; or combinations thereof, and may utilize a variety of networking protocols now available or later developed including, but no limited to TCP/IP-based networking protocols.

The rail sensors 116*b* are position sensors, e.g., magnetic eddy-current, ultrasonic, Hall effect, inductive, etc., to detect locations of the film processing modules 102 along the supporting rail 106. The registration sensor 116*a* and the module sensors 198 are feature-detecting sensors, e.g., a camera, optical, ultrasonic, radio frequency, etc., to detect and locate the demarcations 132 on the film 126 and/or provide discrete inputs to the linear actuator 150 to perform specific movements or movement profiles.

The main controller 110*a* includes a main processor 202*a* and a main memory 204*a*. The rail controller 110*b* includes a rail processor 202*b* and a rail memory 204*b*. The processors 202*a, b* may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memories 204*a, b* may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memories 204*a, b* include multiple kinds of memory, particularly volatile memory and non-volatile memory.

The memories 204*a, b* are computer readable media on which one or more sets of instructions, such as the software for operating the methods of the present disclosure, can be embedded. The instructions may embody one or more of the methods or logic as described herein. For example, the instructions reside completely, or at least partially, within any one or more of the memories 204a, b, the computer readable medium, and/or within the processors 202a, b during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 12:
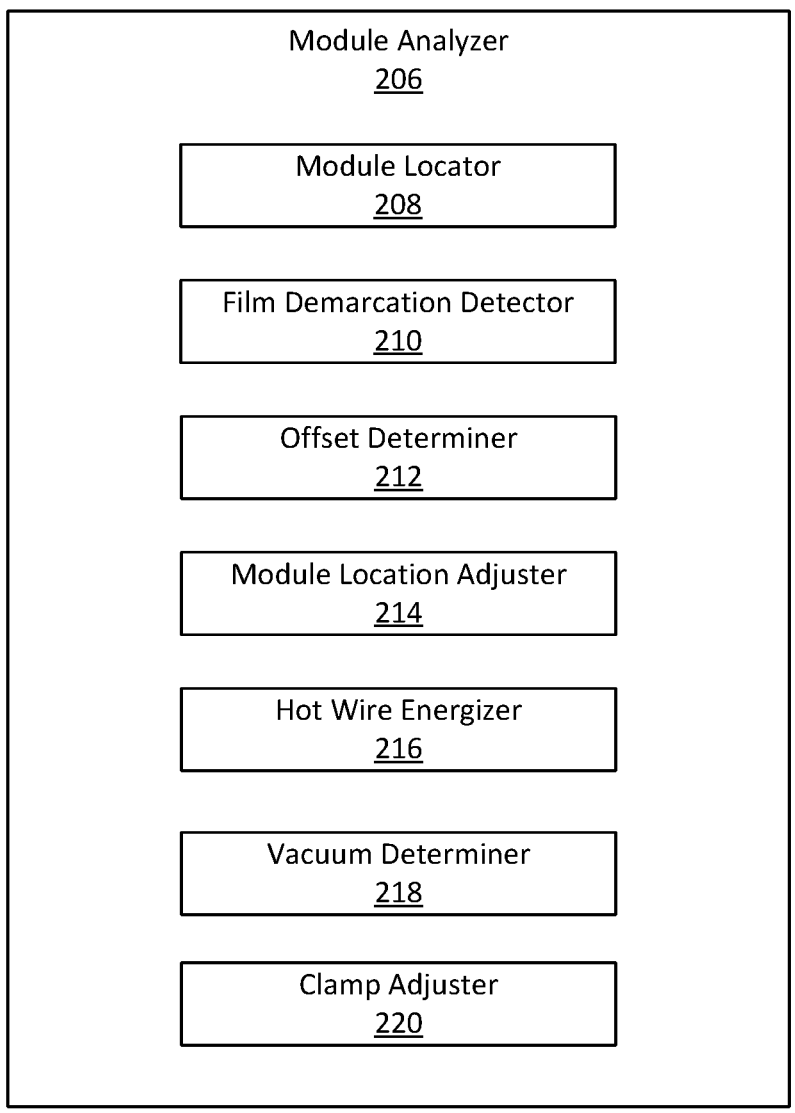
FIG. 12 is a more detailed block diagram of a module analyzer of the film processing station of FIGS. 1 and 2.

The main processor 202a is structured to include a module analyzer 206 (see FIG. 12). The module analyzer 206 includes a module locator 208, a film demarcation detector 210, an offset determiner 212, a module location adjuster 214, a hot wire energizer 216, a vacuum determiner 218, and a clamp adjuster 220.

In operation, the module locator 208 receives signals from the rail sensors 116b corresponding to locations of each of the film processing modules 102 along the supporting rail 106. The module locator 208 monitors the locations of each of the film processing modules 102 as the film processing modules 102 move about the supporting rail 106. As the module locator 208 monitors the locations of the film processing modules 102, the module location adjuster 214 adjusts the locations of each of the film processing modules 102 along the supporting rail 106 and relative to one another via the rail controller 110b, e.g., to move the film processing modules 102 through the film working process, to prevent collisions, etc.

Further in operation, the module location adjuster 214 of FIG. 12 successively moves each of the film processing modules 102 to a start location 230 along the supporting rail 106, as shown in FIG. 2. While the film processing modules 102 are being moved to the start location 230, the clamp adjuster 220 moves their respective upper multi-functional assemblies 152 into a ready position 232 relative to the base 148, as shown in FIGS. 4 and 7. As shown in FIG. 2, the start location 230 is distanced away from the film 126. Thus, the film processing module 102 will not interfere with the film 126 before the upper multi-functional assembly 152 is in the ready position 232. When the upper multi-functional assembly 152 is in the ready position 232, the film processing module 102 is ready to accept the film 126 between the upper multi-functional assembly 152 and the base 148. In some embodiments, the clamping plate 188 is distanced between about 1 to about 3 inches (2.54 and 7.62 centimeters) from the base 148 when the upper multi-functional assembly 152 is in the ready position 232. In a preferred embodiment, the clamping plate 188 is distanced approximately 2.1 inches (5.3 centimeters) from the base 220 when the upper multi-functional assembly 142 is in the ready position 232. Additionally, when the upper multi-functional assembly 152 is in the ready position 232, the hot wire assembly 176 is between the support arm 170 and the clamping plate 188.

Further in operation, in some embodiments, the hot wire energizer 216 energizes the hot wire assembly 176 in preparation to cut the film 126. More specifically, the hot wire energizer 216 accesses the location of the film processing module 102 along the supporting rail 106 determined by the module locator 208. The hot wire energizer 216 then turns on the hot wire assembly 176 such that the cutting mechanism 182 will be hot in time to cut the film 126 further along the supporting rail 106. Thus, the hot wire energizer 216 coordinates and synchronizes energization of the hot wire assembly 176 relative to the supporting rail 106 using information provided by the rail sensors 116. In other words, the hot wire energizer 216 times the heating of the cutting mechanism 182 so the cutting mechanism 182 is ready to cut the film 126 along the first side 118.

In other embodiments, in operation, where the cutting mechanism 182 includes cartridge heaters, the hot wire assembly 176 is continuously heated via the on-board heater controller 196.

Continuing in operation, the module location adjuster 214 of FIG. 11 successively moves each of the film processing modules 102 along the second rounded end 124 toward the first side 118 to intercept the film 126, as shown in FIG. 2. As the film processing modules 102 meet the film 126, the upper multi-functional assemblies 152 are above the film and the bases 148 are below the film 126. When the film processing modules 102 reach an aligned location 234 along the first side 118 of the supporting rail 106, the film processing modules 102 are transverse with respect to an axis A along which the film 126 travels, shown in FIGS. 1 and 2. Additionally, when the film processing modules 102 reach the aligned location 234, their respective upper multi-functional assemblies 152 and bases 148 extend beyond the film 126 with respect to the supporting rail 106, as shown in FIG. 1. In other words, once the film processing module 102 is in the aligned location 234, the film 126 is between and generally perpendicular to the upper multi-functional assembly 152 and the base 148. Further, once the film processing modules 102 reach the aligned location 234, the film processing modules 102 are generally perpendicular to the first side 118. Thus, after reaching the aligned location 234, the film processing modules 102 travel along the supporting rail 106 parallel to the first side 118 and the axis A.

Continuing in operation, in some embodiments, the film demarcation detector 210 of FIG. 12 receives signals from the module sensors 198 of FIG. 11 to detect the demarcations 132 on the film 126, as shown in FIG. 2. In other words, the film demarcation detector 210 looks downwardly on the film 126 using the module sensor 180 to search for the demarcations 132. It should be understood that as the film 126 is provided to the film processing station 100 and the film processing modules 102 meet the film 126 at the aligned location 234, the demarcations 132 may not be directly beneath the upper multi-functional assembly 152.

Further in operation, in such embodiments, once the film demarcation detector 210 detects one of the demarcations 132 on the film 126, the offset determiner 212 of FIG. 12 determines an offset 236 for the demarcation 132 with respect to the cutting mechanism 182, as shown in FIG. 2. More specifically, the offset determiner 212 accesses the location of the film processing module 102 along the supporting rail 106 determined by the module locator 208 to determine a distance between the demarcation 132 and the cutting mechanism 182. In other words, in such embodiments, the offset determiner 212 determines how far the film processing module 102 is out of synchronization with the detected demarcation 132 along the axis A using information provided by the module sensor 180 and the rail sensors 116.

Continuing in operation, in different embodiments, the film demarcation detector 210 of FIG. 12 receives signals from the registration sensor 116a of FIGS. 2 and 11 to detect the demarcations 132 on the film 126, as shown in FIG. 2. In other words, the film demarcation detector 210 looks downwardly on the film 126 using the registration sensor 116a to search for the demarcations 132.

Further in operation, in such embodiments, once the film demarcation detector 210 detects two or more of the demarcations 132 on the film 126, the offset determiner 212 of FIG. 12 determines a frequency (a "pitch") of how quickly the demarcations 132 pass the registration sensor 116a, as shown in FIG. 2. From this frequency, the offset determiner 212 determines the offset 236 of the demarcations 132 with respect to one another, as shown in FIG. 2. In other words, in such embodiments, the offset determiner 212 determines how far the film processing modules 102 are out of synchronization with the detected demarcations 132 along the axis A using information provided by the registration sensor 116a and the rail sensors 116b.

Figure 8:
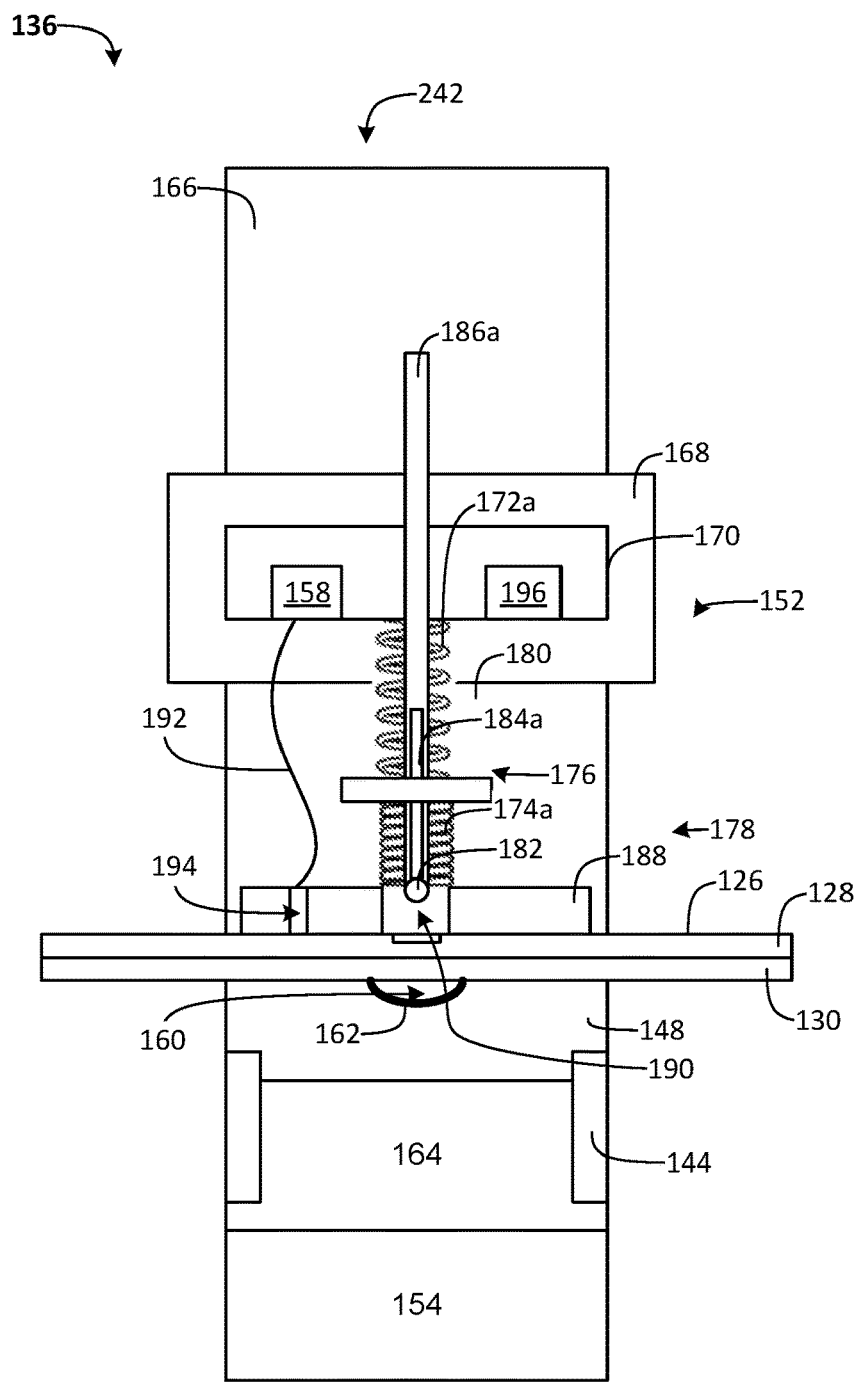
FIG. 8 is a schematic cross-sectional end view of the film processing module of FIG. 5 in the clamping position.

Continuing in operation, the module location adjuster 214 successively moves the film processing modules 102 along the first side 118 from the aligned location 234 toward a first pressed position 238 along the first side 118, as shown in FIG. 2. As the film processing modules 102 transition from the aligned location 234 to the first pressed location 238, the module location adjuster 214 adjusts the location of the film processing modules 102 to close and/or synchronize with the offset 236. More specifically, in some embodiments, as the film processing modules 102 move from the aligned location 234 toward the first pressed location 238, the module location adjuster 214 adjusts the travel speed of the film processing modules 102 along axis A with respect to the film 126 to bring the demarcation 132 between the inlay 160 and the cutting mechanism 182, as shown in FIG. 8. In some embodiments, the module location adjuster 214 adjusts the travel speed of the film processing modules 102 along axis A to bring the demarcation 132 in line with a predetermined reference point of the film processing module 102. In other words, the module location adjuster 214 coordinates and synchronizes the locations of the film processing modules 102 relative to the demarcations 132 using information provided by the rail sensors 116b, the registration sensor 116a, and/or the module sensors 198.

Figure 5:
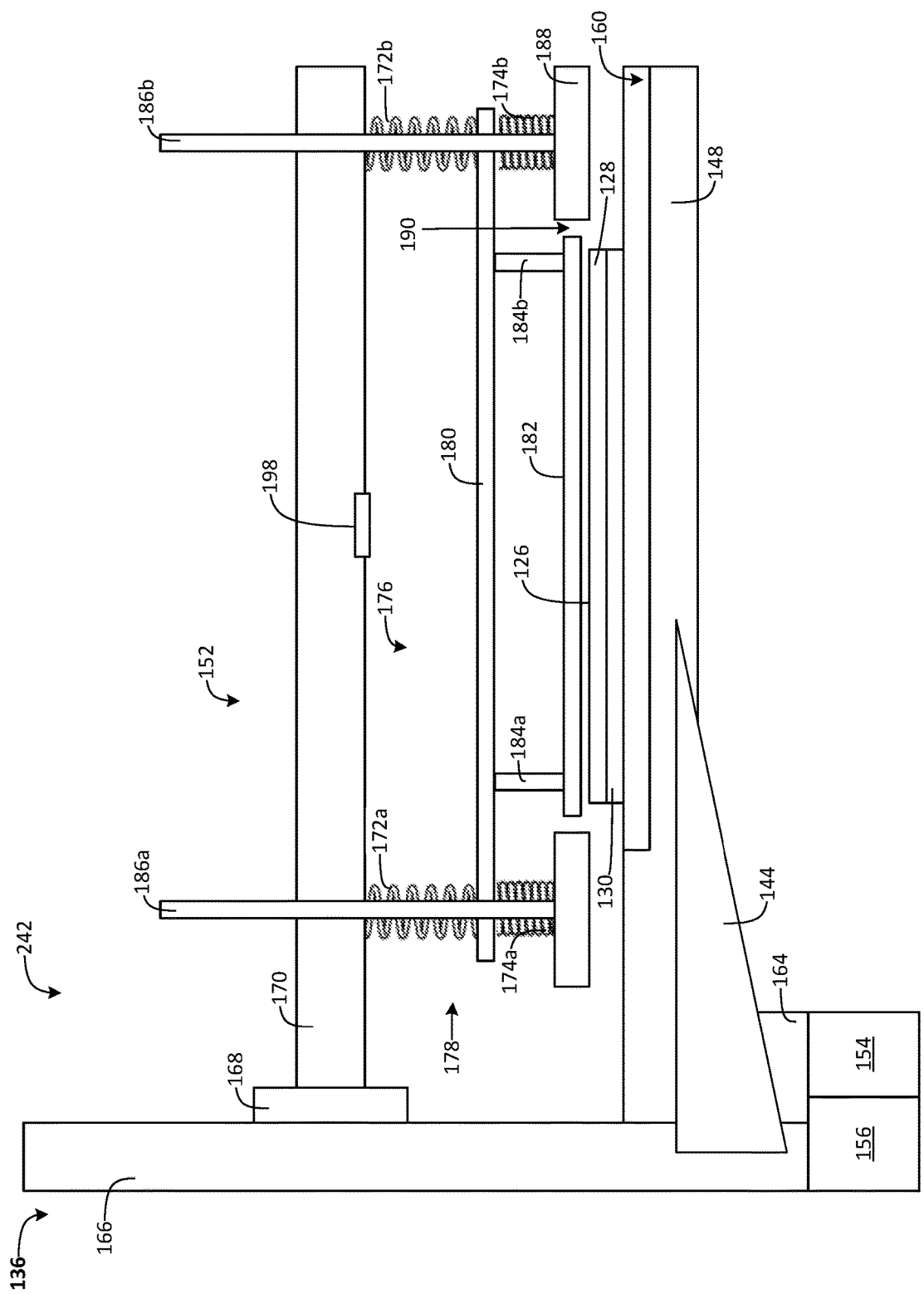
FIG. 5 is a schematic cross-sectional side view of the film processing module of FIG. 4 in a clamping position.

Also in operation, as the film processing modules 102 transition from the aligned location 234 to the first pressed location 238, the clamp adjuster 220 moves their respective upper multi-functional assemblies 152 toward a clamping position 242 relative to the bases 148, as shown in FIGS. 5 and 8.

When the upper multi-functional assembly 152 moves downwardly toward the base 148, the clamping plate 188 contacts the film 126 to compress the first and second lower biasing members 174a, b. When the upper multi-functional assembly 152 moves further downwardly toward the base 148 into the clamping position 242 shown in FIGS. 5 and 8, the first and second lower biasing members 174a, b are compressed and a section of the film 126 is clamped between the clamping plate 188 and the base 148.

As the film processing modules 102 reach the first pressed location 238 along the first side 118, their respective upper multi-functional assemblies 152 reach the clamping position 242 relative to the bases 148. In a preferred embodiment, the cutting mechanism 182 is distanced approximately 0.1 inches (2.54 millimeters) from the base 148 when the upper multi-functional assembly 152 is in the clamping position 242.

Yet further in operation, the module location adjuster 214 successively moves the film processing modules 102 along the first side 118 from the first pressed location 238 toward a second pressed location 244, as shown in FIG. 2. Thus, the clamped film 126 is carried from the first pressed location 238 to the second pressed location 244. In some embodiments, the length of the straight first side 118 corresponds to the time required to perform the cutting and sealing operation for a given film material.

Figure 6:
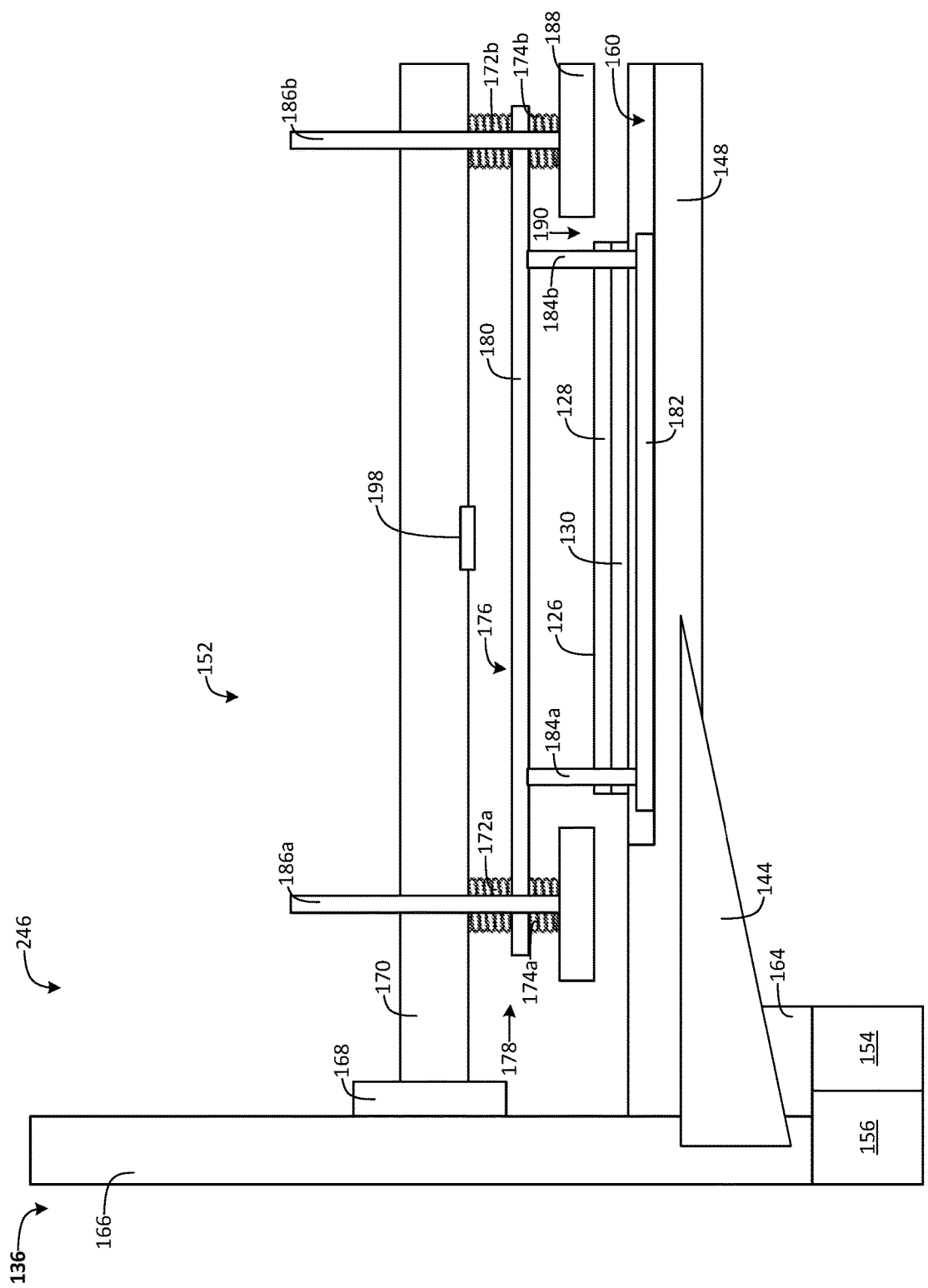
FIG. 6 is a schematic cross-sectional side view of the film processing module of FIGS. 4 and 5 in a cutting position.
Figure 9:
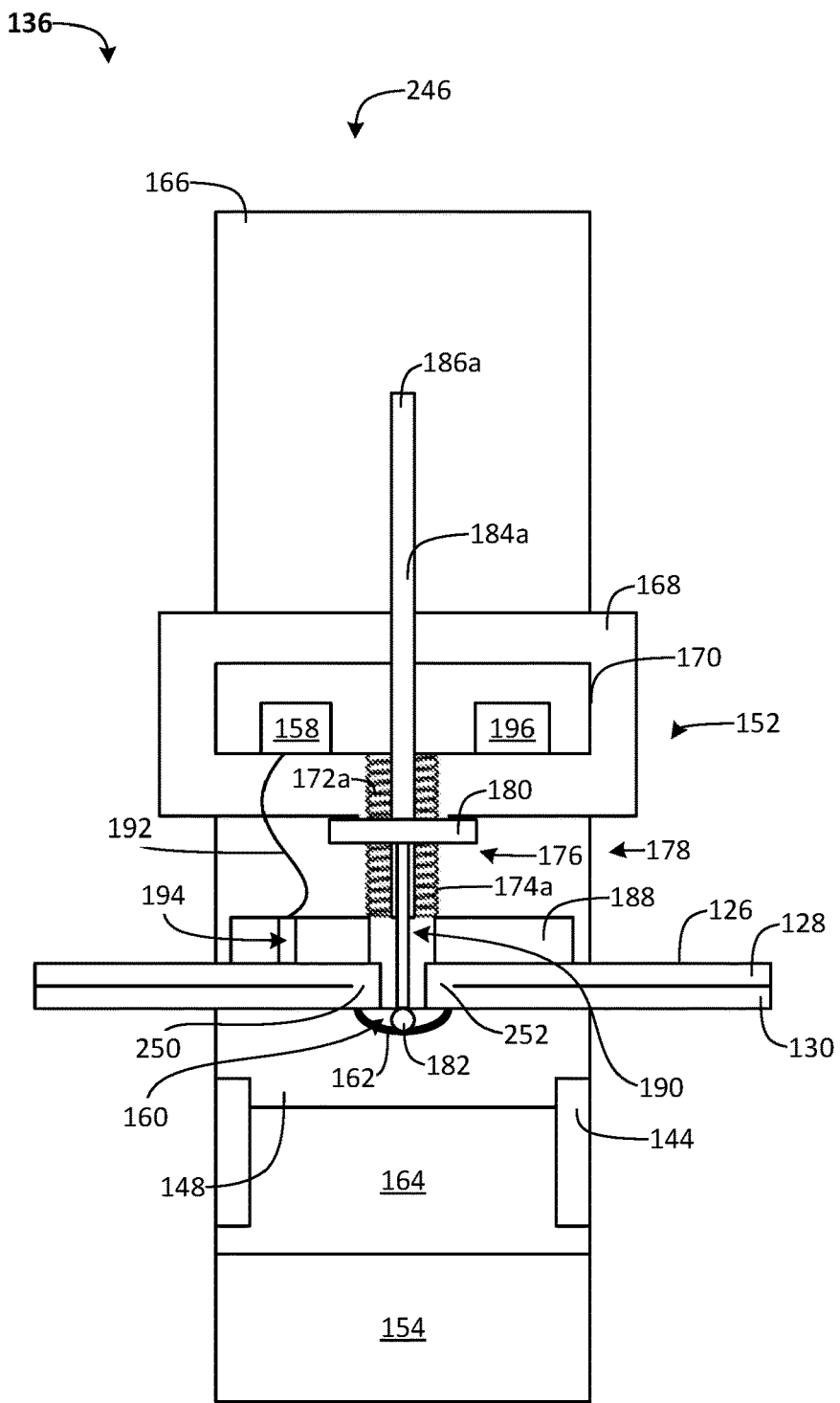
FIG. 9 is a schematic cross-sectional end view of the film processing module of FIG. 6 in the cutting position.

Continuing in operation, during the transition of the film processing modules 102 from the first pressed location 238 to the second pressed location 244, the clamp adjuster 220 moves their respective upper multi-functional assemblies 152 toward a cutting position 246 relative to the bases 148, as shown in FIGS. 6 and 9.

When the upper multi-functional assembly 152 moves from the clamping position 242 toward the cutting position 246 the clamping plate 188 remains stationary relative to the base 148 and the first and second lower biasing members 174a, b are compressed between the clamping plate 188 and the carrier plate 180. Thus, the film 126 is tightly clamped between the clamping plate 188 and the base 148 while the hot wire assembly 176 moves closer toward the base 148.

While the film processing module 102 continues to transition from the first pressed location 238 to the second pressed location 244, the upper multi-functional assembly 152 moves yet further toward the cutting position 246 relative to the base 148 during compression of the first and second lower biasing members 174a, b. The cutting mechanism 182 thus passes through the cutting opening 190, compresses the film 126 against the inlay 160, cuts and seals the film 126, and contacts the inlay 160. In other words, the cutting mechanism 182 cuts and seals the film 126 while the film processing module 102 is between the first pressed location 238 and the second pressed location 244.

Figure 10:
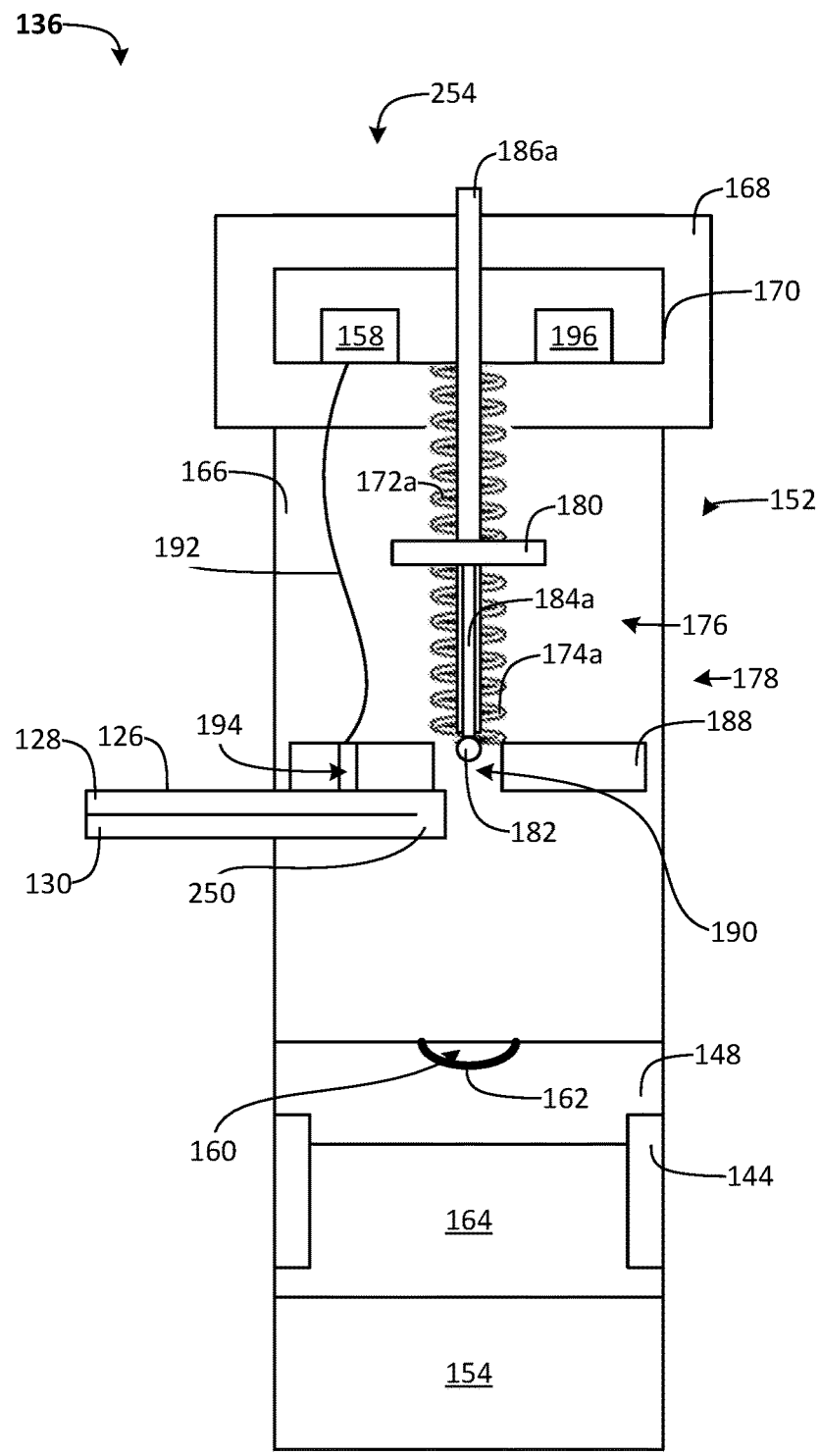
FIG. 10 is a schematic cross-sectional end view of the film processing module in an open position carrying cut and sealed film.

More specifically, the clamp adjuster 220 accesses the location of the film processing module 102 along the supporting rail 106 determined by the module locator 208. The clamp adjuster 220 then moves the upper multi-functional assembly 142 from the clamping position 242 toward the cutting position 246 such that the location of the cut to the film 126 relative to the supporting rail 106 is configured for the hot wire assembly 176 to stay in the cutting position 246 for a predetermined amount of time. Thus, the clamp adjuster 220 coordinates and synchronizes the cutting of the film 126 relative to the supporting rail 106 using information provided by the module sensors 198 and the rail sensors 116b. In other words, the clamp adjuster 220 dynamically times the descent of the upper multi-functional assembly 152 from the clamping position 242 to the cutting position 246 so the cutting mechanism 182 remains in contact with the film 126 for a period of time after the cut is complete. Thus, the film product 142 is robustly sealed when it is deposited on the conveyor 104 at a transfer position 248, as will be explained in greater detail below. In some embodiments, the travel time of the hot wire assembly 176 from the clamping position 242 to the cutting position 246 is between about 0.1 to about 2.0 seconds. It should be appreciated that the compression of the film 126 between the cutting mechanism 182 and the inlay 160, and the dwell period of the hot wire assembly 176 in the cutting position 246, act to apply the necessary heat and pressure to a predetermined position on the film 126 to cut top and bottom layers 128, 130, respectively, thereof, and to fuse the top and bottom layers 128, 130 into a leading seal 250 and a trailing seal 252, as shown in FIGS. 9 and 10. Thus, the hot wire assembly 176 cuts the film 126 into individual sealed film products 142, e.g., individual pouches, with predetermined lengths, as shown in FIGS. 1 and 2. It should also be appreciated that the inlay 160 acts as a hard stop for the cutting mechanism 182 at the cutting position 246 and thus also the upper multi-functional assembly 152, as shown in FIGS. 6 and 9.

Even further in operation, the module location adjuster 214 successively moves the film processing modules 102 along the first side 118 from the second pressed location 244 to the transfer location 248 along the first side 118, as shown in FIG. 2. As the film processing modules 102 transition from the second pressed location 244 to the transfer location 248, the clamp adjuster 220 moves their respective upper multi-functional assemblies 152 into an open position 254 relative to the bases 148, as shown in FIG. 10. In some embodiments, the clamping plate 188 is distanced between about 3 to about 7 inches (7.62 and 17.78 centimeters) from the base 148 when the upper multi-functional assembly 152 is in the open position 254. In a preferred embodiment, the clamping plate 188 is distanced about 5.1 inches (12.95 centimeters) from the base 148 when the upper multi-functional assembly 152 is in the open position 254. Thus, the multi-functional assemblies 152 and the carried film products 142 are placed over the conveyor 104. Additionally, the base 148 is under the conveyor 104 at the transfer location 248. When each film processing module 102 reaches the transfer location 248, the sealed film product 142 is deposited onto the conveyor 104. Thus, a continuous series of individual sealed film products 142 is placed along the conveyor 104, as shown in FIGS. 1 and 2.

In some embodiments, the sealed film products 142 are temporarily retained against the clamping plate 188 adhesively and/or via electrostatic forces.

In embodiments including the air controller 158, in operation, the vacuum determiner 218 energizes the air controller 158 as the upper multi-functional assembly 152 rises from the cutting position 246 to the open position 254 to draw air out of the airflow lines 192 and the airflow openings 194. Thus, the air controller 158 forms a vacuum between the cut film 126 and the clamping plate 188 and the cut film 126 is retained against the clamping plate 188 by atmospheric air pressure. In such embodiments, the vacuum determiner 218 de-energizes the air controller 158 at the transfer location 248 to release the cut film 126 from the clamping plate 188 onto the conveyor 104. Alternatively, in such embodiments, the vacuum determiner 218 reverses the air controller 158 at the transfer location 248 to blow the cut film 126 from the clamping plate 188 onto the conveyor 104. In such embodiments, the vacuum determiner 218 de-energizes the air controller 158 once the film product 142 is blown onto the conveyor 104.

While the above description discusses how the upper multi-functional assembly 152 moves toward and away from the base 148, it is contemplated that, in some embodiments, the film processing module 102 may be arranged for the upper multi-functional assembly 152 to be stationary with respect to the linear actuator 150 and the base 148 to be engaged with the linear actuator 150 to be moveable toward and away from the upper multi-functional assembly 152. It is further contemplated that, in some embodiments, the film processing module 102 may be arranged for the upper multi-functional assembly 152 and the base 148 to be moveably engaged with the linear actuator 150 and thus moveable with respect to one another. In other words, all arrangements where the base 148 and the upper multi-functional assembly 152 move relative to one another via the linear actuator 150 are contemplated.

Continuing in operation, in some embodiments, the hot wire energizer 216 de-energizes the hot wire assembly 176 once the film products 142 are deposited on the conveyor 104. More specifically, the hot wire energizer 216 accesses the location of the film processing module 102 along the supporting rail 106 determined by the module locator 208. The hot wire energizer 216 then turns off the hot wire assembly 176 when the film processing module 102 moves past the transfer location 248. Thus, the hot wire energizer 216 coordinates and synchronizes de-energization of the hot wire assembly 176 relative to the supporting rail 106 using information provided by the rail sensors 116. In other words, the hot wire energizer 216 times the de-energization of the cutting mechanism 182 to save electrical energy when the cutting mechanism 182 is not in use.

Continuing in operation, the module location adjuster 214 successively moves the film processing modules 102 along the first rounded end 122 and the second side 120, e.g., a "back stretch," of the supporting rail 106 to the start location 230. Meanwhile, the clamp adjuster 220 moves the upper multi-functional assembly 152 to the ready position 232 relative to the base 148, as shown in FIGS. 3 and 7. Thus, the controller 110 prepares the film processing modules 102 to meet successive new sections of film 126 at the aligned location 234.

It is contemplated that in addition or alternatively to the operations of the film processing modules 102 coordinated by the main controller 110*a* using the module analyzer 206, the main controller 110*a* may also dynamically coordinate functions performed by alternative film processing modules mounted to the supporting rail 106. Thus, the main controller 110*a* may coordinate and synchronize the clamping and cutting functions performed by the film processing modules 102 with additional functions performed by other types of modules. For example, the main controller 110*a* may coordinate the clamping and cutting of the film by the film processing modules 102 with an embossing module that shapes decorative patterns and/or production information into the film 126, a printing module that prints decorative patterns and/or production information onto the film 126, a perforating module that perforates the film 126, etc.

Figure 13:
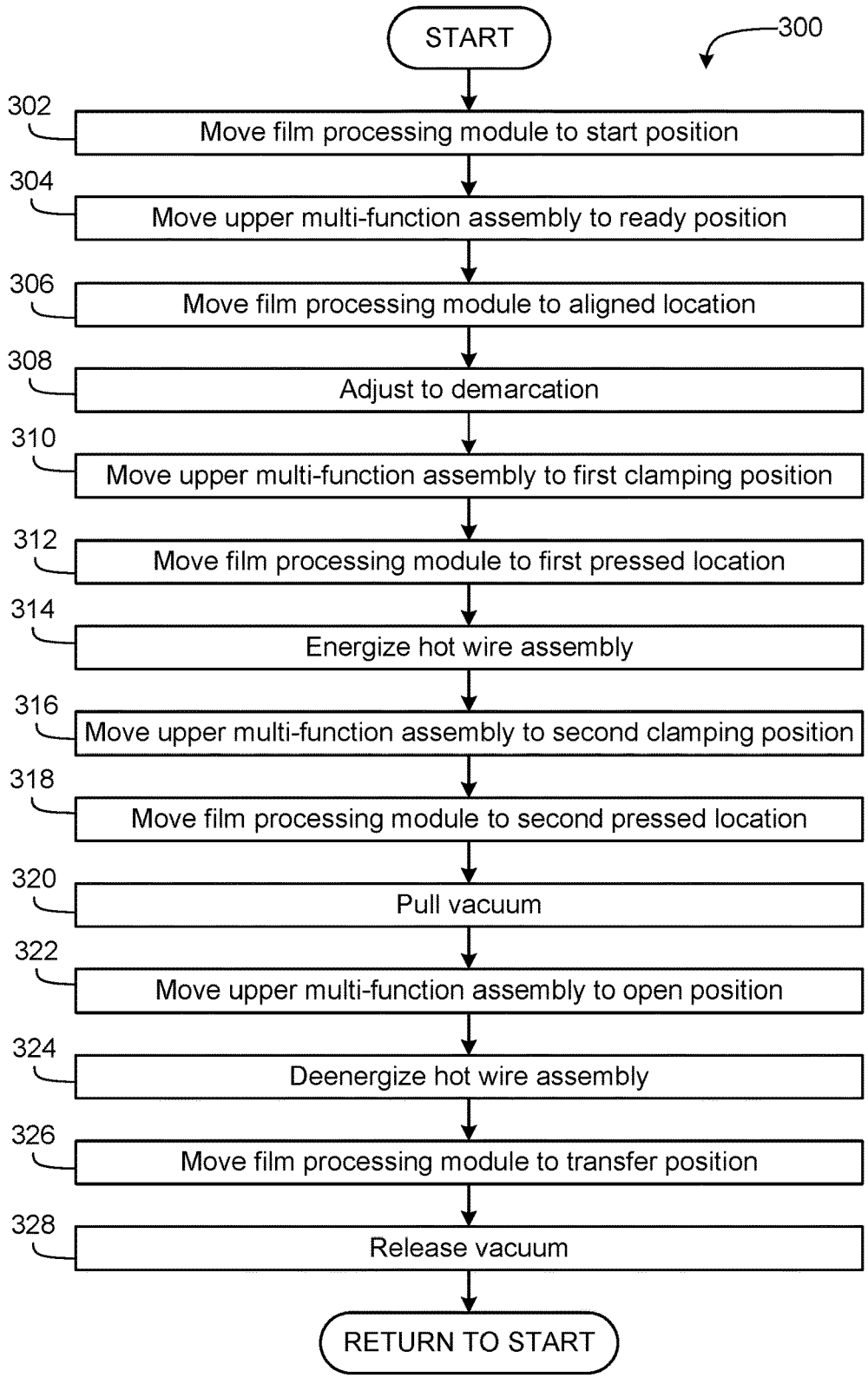
FIG. 13 is a flowchart representative of an example method that may be performed to process plastic film into pouches.

FIG. 13 is a flowchart representative of an example method 300 that may be performed to process plastic film into pouches. The flowchart of FIG. 13 is representative of machine readable instructions that are stored in memory (such as the memory 204*a* of FIG. 11) and include one or more programs which, when executed by a processor (such as the processor 202*a* of FIG. 1*a*), cause the main controller 110*a* to operate the film processing modules 102 of FIGS. 1-10 on the supporting rail 106 of FIGS. 1 and 2. While the example program is described with reference to the flowchart illustrated in FIG. 13, many other methods of operating the film processing modules 102 on the supporting rail 106 may alternatively be used. For example, the order of execution of the blocks may be rearranged, changed, eliminated, and/or combined to perform the method 300. Further, because the method 300 is disclosed in connection with the components of FIGS. 1-10, some functions of those components will not be described in detail below.

Initially, at block 302, the main controller 110*a* moves the film processing module 102 to the start location 230. Thus, the main controller 110*a* positions the film processing module 102 along the supporting rail 106 at a starting location away from the film 126.

At block 304, the main controller 110*a* moves the upper multi-functional assembly 152 to the ready position 232. When the upper multi-functional assembly 152 is in the ready position 232, the film processing module 102 is ready to accept the film 126 between the upper multi-functional assembly 152 and base 138.

At block 306, the main controller 110a moves the film processing module 102 to the aligned location 234. As the film processing module 102 moves to the aligned location 234, the film 126 is placed between the upper multi-functional assembly 152 and the base 148.

At block 308, the main controller 110a adjusts the location of the film processing module 102 along the supporting rail 106 to synchronize with one or more of the demarcations 132 on the film 126. The film processing module 102 is aligned with the demarcation 132 to produce regularly-sized film products 142.

At block 310, the main controller 110a moves the upper multi-functional assembly 152 to the clamping position 242. When the upper multi-functional assembly 152 moves to the clamping position 242, the lower biasing members 174a, b are compressed and the clamping plate 188 compresses the film 126 against the base 148.

At block 312, the main controller 110a moves the film processing module 102 to the first pressed location 238. Thus, the film processing module 102 carries the clamped film 126 as the film processing module 102 reaches the first pressed location 238.

In some embodiments, at block 314, the main controller 110a energizes the hot wire assembly 176. Thus, the cutting mechanism 182 of the hot wire assembly 176 heats up in preparation to cut and seal the film 126. It should be understood that, in some embodiments, the hot wire assembly 176 is continuously heated via the on-board heater controller 196.

At block 316, the main controller 110a moves the upper multi-functional assembly 152 to the cutting position 246. When the upper multi-functional assembly 152 descends to the cutting position 246, the first and second lower biasing members 174a, b are compressed further, the cutting mechanism 182 passes through the cutting opening 190, the cutting mechanism 182 cuts and seals the film 126, and the cutting mechanism 182 comes to a hard stop against the inlay 160.

At block 318, the main controller 110a moves the film processing module 102 to the second pressed location 244. Thus, the film processing module 102 carries the clamped film 126 as the film processing module 102 moves toward the second pressed location 244. It should be understood that the travel time period between the first and second pressed locations 238, 244 allows the cutting mechanism 182 to form the leading and trailing seals 250, 252.

In embodiments including the air controller 158, the main controller 110a pulls a vacuum at block 320. More specifically, the main controller 110a energizes the air controller 158 to draw air through the airflow lines 192 and airflow openings 194 to retain the film 126 against the clamping plate 188.

At block 322, the main controller 110a moves the upper multi-functional assembly 152 to the open position 254. Thus, the main controller 110a raises the multi-functional assembly 152 along with the film 126 away from the base 148. When the multi-functional assembly 152 moves to the open position 254, the cutting mechanism 182 retracts away from the film 126 back through the cutting opening 190.

At block 324, the main controller 110a de-energizes the hot wire assembly 176. The cutting mechanism 182 is thus turned off. It should be understood that turning off the cutting mechanism 182 after cutting and sealing the film 126 may save electrical energy during production of the film products 142.

At block 326, the main controller 110a moves the film processing module 102 to the transfer location 248. Thus, the upper multi-functional assembly 152 and the carried film product 142 are placed over the conveyor 104.

In embodiments including the air controller 158, the main controller 110a releases the vacuum at block 328. In some embodiments, the main controller 110a de-energizes the air controller 158 and the film product 142 passively falls onto the conveyor 104. In some embodiments, the main controller 110a reverses the air controller 158 to actively blow the film product 142 onto the conveyor 104 and then de-energizes the air controller 158. It should be understood that turning off the air controller 158 after depositing the film product 142 on the conveyor 104 may save electrical energy during production of the film products 142. The method 300 then returns to block 302.

From the foregoing, it will be appreciated that the above disclosed system and method disclose a film processing station 100 that reduces the number of machines and associated footprint size of machines used to produce film products and may thus aid in reducing associated manufacturing costs and energy consumption. Further, because the film processing modules 102 are interchangeable, individual film processing modules 102 may be easily removed from the film processing station 100, e.g., for maintenance, thus reducing unproductive down time of the film processing station 100 and associated costs. Additionally, because the cutting mechanism 182 dwells on the film 126 and then retracts away above the clamping plate 188, the film processing modules 102 produce film products 142 with robust seals while reducing manufacturing defects, associated film waste, and associated disposal costs.

Moreover, because the above disclosed film processing station 100 dynamically aligns the film processing modules 102 with the web of film 102, asynchronous processing and cutting, sometimes referred to as "creep," in images on pre-printed film rolls may be avoided. The present film processing station 100 system and associated methods advantageously allow for real-time adjustment of the film processing modules 102 relative to the web of film 126 supplied to the film processing station 100. Thus, the present film processing station 100 system and associated methods compensate for differences between supplied webs of film 126 without the stopping of the process. Such advantages are also applicable to any process that contemplates uniform cutting between sheet and/or film products from the same or different sources.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the examples disclosed and defined herein extend to all alternative combinations of two or more of the individual features mentioned or evident from the text and/or drawings. All of these different combinations constitute various alternative aspects of the present disclosure. The examples described herein explain the best modes known for practicing the disclosure and will enable others skilled in the art to utilize the disclosure. The claims are to be construed to include alternative examples to the extent permitted by the prior art.

What is claimed is:

1. A film processing module, comprising:
   a carriage assembly configured to move along a supporting rail;
   a linear actuator engaged with the carriage assembly;
   an upper multi-functional assembly engaged with the linear actuator to perform a function on a film adjacent to the supporting rail;
   a battery, wherein one or more of the carriage assembly, the linear actuator, and the upper multi-functional assembly are electrically powered by the battery; and
   a module sensor in communication with a processor, the processor configured to determine an offset of the film processing module relative to a demarcation of the film based on information from the module sensor.

2. The film processing module of claim 1, wherein the module sensor is an optical sensor.

3. The film processing module of claim 1, wherein the upper multi-functional assembly is adapted to clamp, cut, and seal the film.

4. The film processing module of claim 1, wherein one or more of the carriage assembly, the linear actuator, and the upper multi-functional assembly are electrically powered by a bus disposed concentrically to the supporting rail.

5. The film processing module of claim 1, further comprising a battery, wherein one or more of the carriage assembly, the linear actuator, and the upper multi-functional assembly are electrically powered by the battery.

6. A film processing module, comprising:
   a carriage assembly moveable along a supporting rail;
   a linear actuator engaged with the carriage assembly;
   a base engaged with the linear actuator;
   an upper multi-functional assembly driveably engaged with the linear actuator to move relative to the base, the upper multi-functional assembly including:
      a clamping plate to selectively clamp a portion of a film against the base; and
      a cutting mechanism to cut and seal the portion of the film,
      wherein the clamping plate defines an air opening and further comprises an air pump in fluid communication with the air opening, the air pump to draw a vacuum to retain the film against the clamping plate, and
   an airflow line engaged with the clamping plate, the air pump being in fluid communication with the air opening via the airflow line.

7. The film processing module of claim 6, wherein the cutting mechanism heats when an electric current is applied to the cutting mechanism.

8. The film processing module of claim 6, wherein the clamping plate is between the cutting mechanism and the base when the upper multi-functional assembly is in a ready position relative to the base.

9. The film processing module of claim 6, wherein the clamping plate is between the cutting mechanism and the base when the upper multi-functional assembly is in a clamping position relative to the base.

10. The film processing module of claim 6, wherein the cutting mechanism extends at least partially between the clamping plate and the base when the upper multi-functional assembly is in a cutting position relative to the base.

11. The film processing module of claim 6, wherein the base defines an inlay shaped to receive the cutting mechanism when the upper multi-functional assembly is in a cutting position relative to the base.

12. The film processing module of claim 11, wherein the inlay is lined with an elastomer.

13. The film processing module of claim 6, wherein the clamping plate defines a cutting opening through which the cutting mechanism passes as the upper multi-functional assembly moves relative to the base.

14. The film processing module of claim 6, further comprising a cartridge heater, wherein the cutting mechanism is a knife configured to be heated by the cartridge heater.

15. The film processing module of claim 14, wherein the upper multi-functional assembly comprises upper and lower biasing members to urge the clamping plate toward the base.

16. The film processing module of claim 15, wherein the lower biasing member is compressed:
   when the upper multi-functional assembly is in a clamping position relative to the base; and
   when the upper multi-functional assembly is in a cutting position relative to the base.

17. The film processing module of claim 6, wherein the upper multi-functional assembly includes:
   a support arm engaged with the linear actuator;
   an upper biasing member engaged with the support arm; and
   a lower biasing member engaged with the upper biasing member and the clamping plate;
   wherein the upper and lower biasing members bias the clamping plate toward the base.

18. The film processing module of claim 17, wherein the upper and lower biasing members are uncompressed when the upper multi-functional assembly is in a ready position relative to the base.

19. The film processing module of claim 17, wherein the upper biasing member is uncompressed when the upper multi-functional assembly is in a clamping position relative to the base.

20. The film processing module of claim 17, wherein the upper biasing member is compressed when the upper multi-functional assembly is in a cutting position relative to the base.

21. The film processing module of claim 6, wherein the cutting mechanism is a cutting wire.

22. A method for producing sealed film products, comprising:
   moving, with a processor, an upper multi-functional assembly of a film processing module to a ready position relative to a base of the film processing module;
   moving, with the processor, the film processing module to an aligned location on an oblong supporting rail such that a portion of a film running parallel to the oblong supporting rail is between the upper multi-functional assembly and the base;
   moving, with the processor, the upper multi-functional assembly toward the base to a clamping position to clamp the film;
   energizing, with the processor, a cutting mechanism of the upper multi-functional assembly to heat the cutting mechanism;
   moving, with the processor, the upper multi-functional assembly toward the base to a cutting position to cut the film;
   moving, with the processor, the upper multi-functional assembly away from the base to an open position;
   moving, with the processor, the film processing module to a transfer location on the oblong supporting rail such that a conveyor is between the upper multi-functional assembly and the base;

controlling, with the processor, an air controller to draw a vacuum to retain cut film against the upper multi-functional assembly; and releasing, with the processor, the vacuum to deposit the cut film on the conveyor.

23. A system, comprising:

an oblong supporting rail;

a power source and a controller in electrical communication with the supporting rail; and a film processing module moveably engaged with the supporting rail, the film processing module including:

a base;

an upper multi-functional assembly including a clamping plate and a cutting mechanism in electrical communication with the power source and the controller to cut and seal film; and a linear actuator fixed to the base and driveably engaged to the upper multi-functional assembly to move the upper multi-functional assembly relative to the base, wherein the clamping plate defines an air opening and the film processing module includes an air controller in fluid communication with the air opening, the air controller to draw a vacuum to retain the film against the clamping plate.

24. The system of claim 23, wherein the cutting mechanism is a cutting wire.

* * * * *